United States Patent [19]

Carlin et al.

[11] Patent Number: 4,551,719
[45] Date of Patent: Nov. 5, 1985

[54] OIL FIELD LEASE MANAGEMENT AND SECURITY SYSTEM AND METHOD THEREFOR

[75] Inventors: John A. Carlin, Aspen; William G. Mesch, Denver; William L. Mobeck, Denver; Randall D. Thompson, Denver; Jules B. Henthorn, Aurora; Benjamin L. Lopez, Westminster, all of Colo.

[73] Assignee: Cypher Systems, Denver, Colo.

[21] Appl. No.: 472,651

[22] Filed: Mar. 7, 1983

[51] Int. Cl.⁴ .............................................. H04Q 9/00
[52] U.S. Cl. ................................. 340/825.36; 364/465
[58] Field of Search .................... 340/825.36, 825.31, 340/825.32, 825.34; 235/380, 381; 364/465; 222/26, 30

[56] References Cited

U.S. PATENT DOCUMENTS

| | | | |
|---|---|---|---|
| 3,144,046 | 11/1964 | Seesselberg | 137/551 |
| 3,444,521 | 5/1969 | Breese | 340/825.07 |
| 3,553,636 | 1/1971 | Baird | 340/1 |
| 3,644,713 | 2/1972 | Hayakawa et al. | 235/381 |
| 3,735,377 | 5/1973 | Kaufman | 340/248 |
| 3,740,739 | 6/1973 | Griffin, III et al. | 340/239 |
| 3,858,181 | 12/1974 | Goldsby et al. | 340/150 |
| 3,921,152 | 11/1975 | Hagar | 340/825.07 |
| 3,928,848 | 12/1975 | Banville | 340/409 |
| 3,939,471 | 2/1976 | Memberg | 340/59 |
| 4,102,394 | 7/1978 | Botts | 340/825.06 |
| 4,170,765 | 10/1979 | Austin et al. | 367/100 |
| 4,188,624 | 2/1980 | Hochsprung | 340/606 |
| 4,203,324 | 5/1980 | Baumoel | 73/290 |
| 4,210,969 | 7/1980 | Massa | 367/108 |
| 4,212,201 | 7/1980 | Hirsch | 73/290 |
| 4,221,004 | 9/1980 | Combs | 367/114 |
| 4,229,798 | 10/1980 | Rosie | 364/564 |
| 4,248,087 | 2/1981 | Dennis | 73/290 |
| 4,264,788 | 4/1981 | Keidel | 179/110 |
| 4,275,382 | 6/1981 | Jannotta | 340/151 |
| 4,313,168 | 1/1982 | Stephens et al. | 364/465 |
| 4,325,255 | 4/1982 | Howard | 73/589 |
| 4,342,976 | 8/1982 | Jannotta | 340/870 |
| 4,353,245 | 10/1982 | Nicolai et al. | 73/49 |
| 4,395,626 | 7/1983 | Barker et al. | 340/825.35 |

OTHER PUBLICATIONS

"Dots: Solution to Oil Thefts?"—The Bakersfield California—May 12, 1982 by James F. Bylin.
"Oil Thefts put in Millions" by William R. Ritz—The Denver Post, Mar. 16, 1981.
"Detective Keeps Eye on Oil Fields"—Childress, Texas—New York Times.
"Oil, Gas Royalty Act Signed"—Rocky Mountain News—Jan. 13, 1983.
"Big Trouble"—Editorial Comment by R. W. Scott, Editor—World Oil, Mar. 1982.
Security Systems Digest, vol. 13, No. 3, Feb. 10, 1982.
"Federal Oil and Gas Royalty Management Act" by Hon. Ken Kramer of Colorado—Congressional Record—Dec. 14, 1982.
"Congress Acts to Halt Oil Thefts"—The Denver Post—Dec.
Speech of Hon. Ray Kogovsek of Colorado-Congressional Record—Dec. 29, 1982.

*Primary Examiner*—Donald J. Yusko
*Attorney, Agent, or Firm*—Robert C. Dorr

[57] ABSTRACT

The oil field lease management and security system and method of the present invention for monitoring oil field equipment and for communicating with authorized operators. The system of the present invention includes a plurality of transducers connected to the equipment for sensing operational parameters of the equipment such as fluid levels in oil field storage tanks, a plurality of controllers connected to the equipment for controlling operational components of the equipment such as determining when an oil tank is filled and activating a shut-off valve to prevent further filling of the tank, a communication access panel for allowing an authorized operator to interface with the system, and a monitoring system interconnected with the transducers, the controllers, and the communication access panel for periodically monitoring each of the transducers and the communication access panel wherein the monitoring system is capable of storing transducer information corresponding to the operational parameters from the transducers such as the levels of oil in the storage tanks and operator information from the communication access panel such as the operator's password and access code.

28 Claims, 28 Drawing Figures

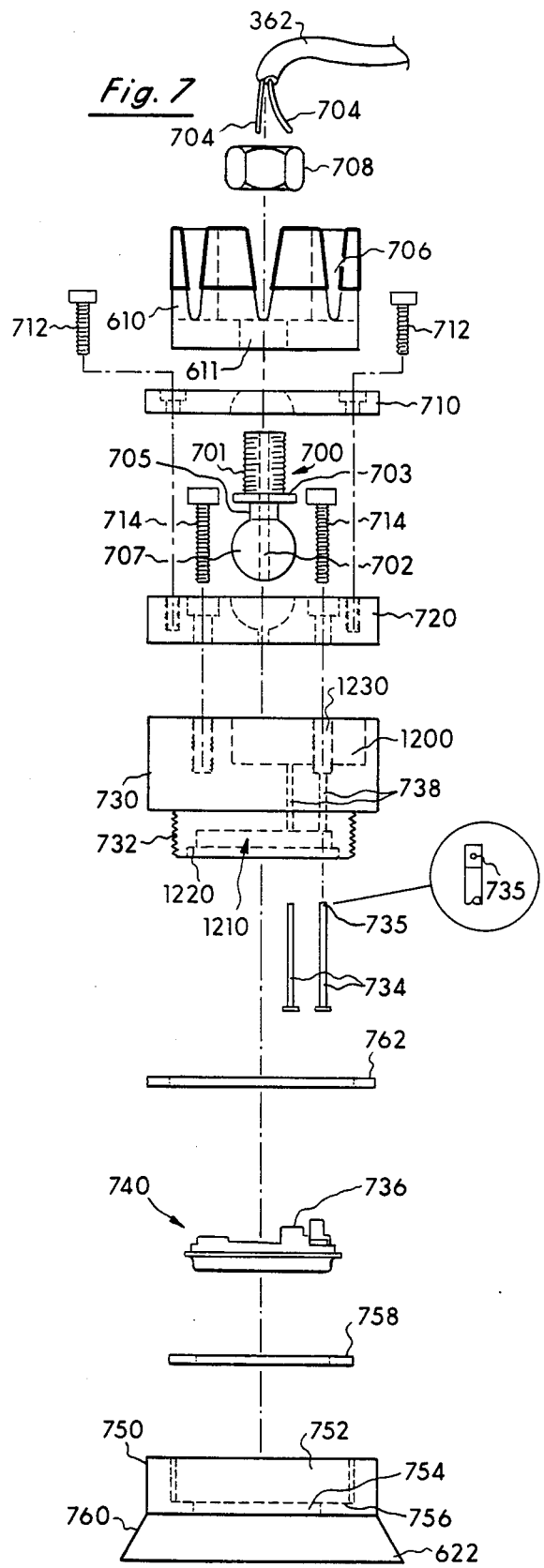
Fig. 7
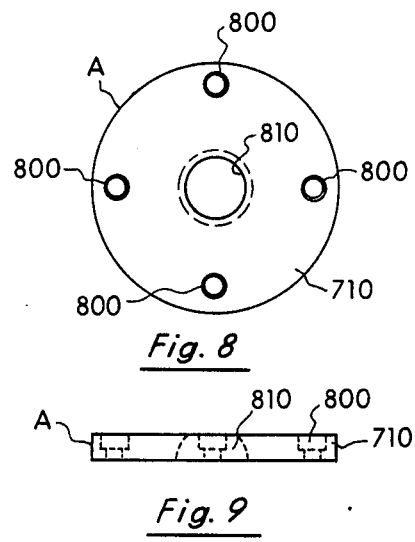
Fig. 8
Fig. 9
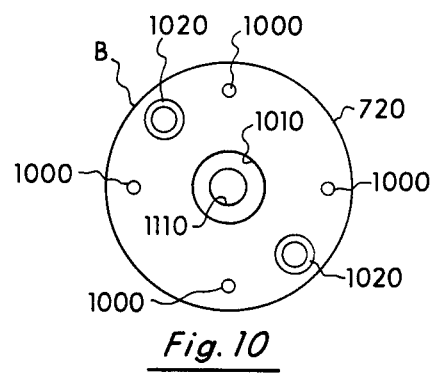
Fig. 10
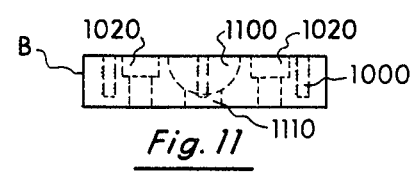
Fig. 11

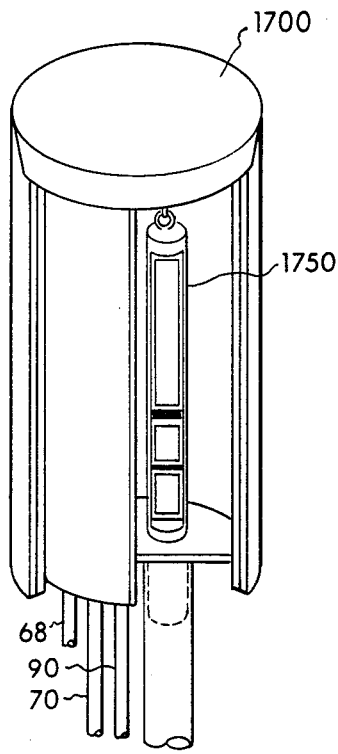
Fig. 18
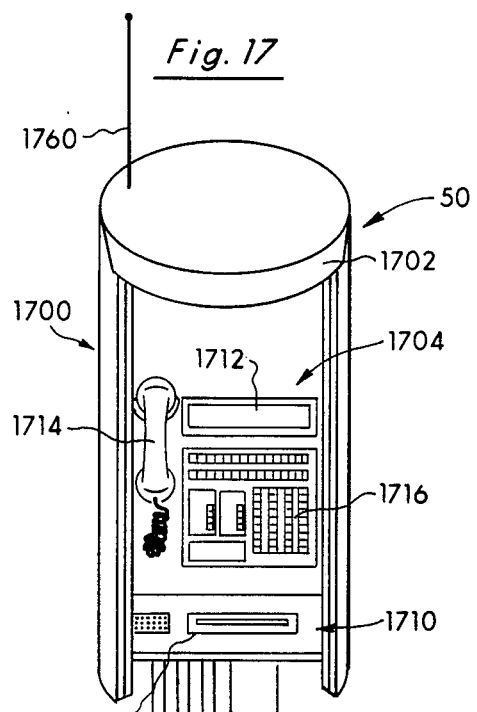
Fig. 17
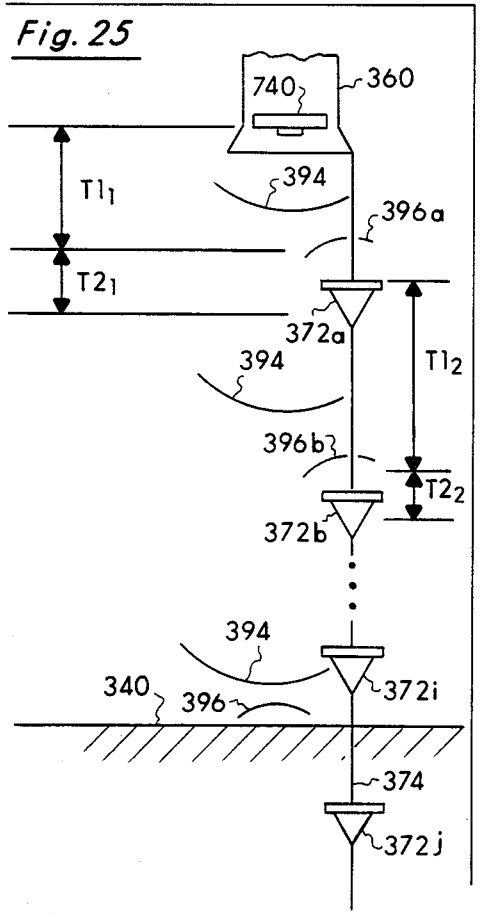
Fig. 25
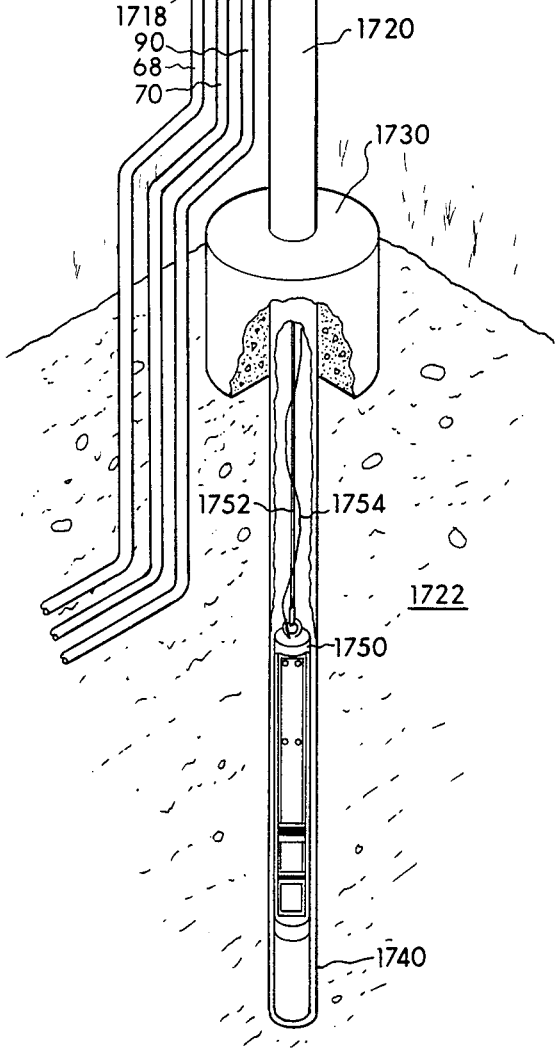

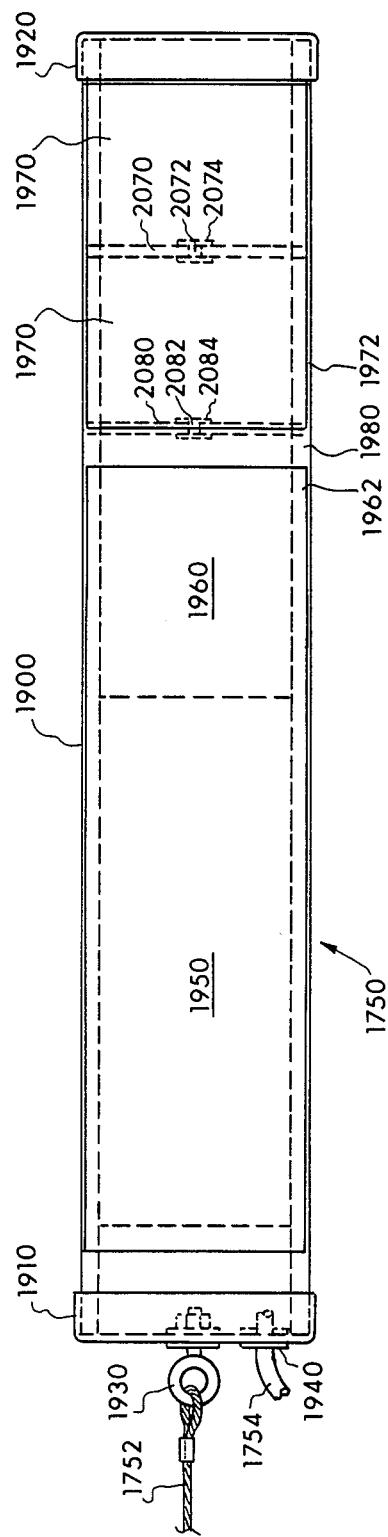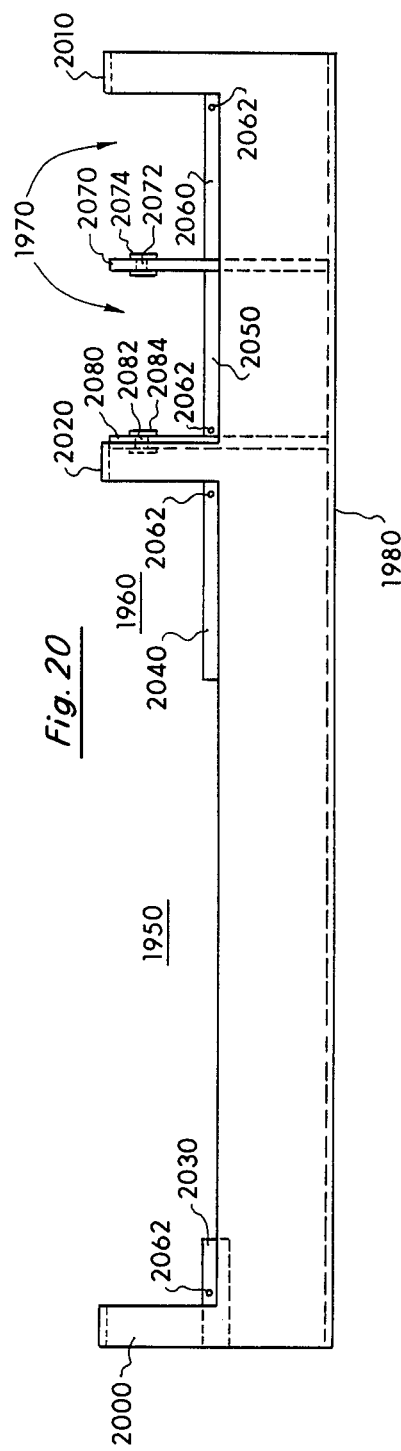

4,551,719

OIL FIELD LEASE MANAGEMENT AND SECURITY SYSTEM AND METHOD THEREFOR

BACKGROUND OF THE INVENTION

1. Related Application

This application is related to Storage Tank Level Monitoring Apparatus and Method Therefor, Ser. No. 473,144, filed Mar. 7, 1983, by John Carlin, William Mesch, Randall Thompson, Steven Beard and Tracy Stephens now U.S. Pat. No. 4,487,065 issued 12-11-84.

2. Field of the Invention

The present invention relates to a centralized system and method for monitoring and controlling oil field lease equipment and product and for securing said equipment and product against damage and theft, and, in particular, to a system and method for monitoring oil field lease equipment parameters such as storage tank levels and pumper and heater treater operation, for controlling the oil lease equipment such as diverting production when a storage tank is full, and for signaling an alarm when the theft of crude oil from a tank occurs.

3. Description of the Prior Art

For years equipment at oil field leases such as storage tanks, heater treaters, and horse-head pumpers have been monitored and maintained by personnel periodically visiting the lease. Depending on the production and size of the lease, such visits may be daily or less often. Rarely, however, are personnel stationed full time at the lease. Such personnel "manage" the lease by manually filling out various reports showing such parameters as oil levels in storage tanks, crude oil purchases from the lease, production from the wells and the like. These reports, which typically are filled out by different persons, are eventually delivered to a central location for processing. Such infrequent monitoring of the lease leads to theft of equipment, theft of crude oil, and to loss of equipment through destruction such as by fire or equipment malfunction.

The problem of crude oil theft is of special concern since for years, such theft of crude on oil leases in the United States and worldwide was generally an uncontrollable situation in the oil and gas industry. This was due, in part, to the remoteness of the oil leases and, in part, due to the undue cost in providing personnel to supervise and monitor such isolated equipment and storage tanks on a full time basis. The theft of crude oil typically occurred in fields not utilizing pipe line connections and which required the crude to be hauled out in tanker trucks. Hence, crude could be stolen by any person having access to a storage tank including truck drivers, producers, oil reclaimers, pumpers or other oil field employees. The techniques used by such thieves are numerous and varied. For example, in a typical oil field operation, a person called a gauger measures the amount of crude in a storage tank on a regular basis. If the gauger "misreads" the measurement and, for example, is off by three inches in a five hundred barrel tank, approximately eight barrels of crude are unaccounted for. *The Denver Post*, Volume 89, No. 228, Mar. 16, 1981, Page 1. In other cases, monthly production reports are doctored "to show a well was out of production for several days due to a mechanical malfunction while, in reality, the well continued to produce oil." Id. Also, valves on large tanks can be opened to allow crude to drain into a nearby pit and, subsequently, a vacuum truck pulls along side the pit and removes the crude. The aforesaid *Denver Post* article documents numerous other ways in which crude can be illegally taken from an oil lease through manipulation of the equipment or through improper record keeping pertaining to the oil lease.

Within the last ten years, and with the occurrence of a recent and severe oil and gas shortage, this critical theft problem became acute and the amount of stolen crude became considerable. It has been estimated that over $650 million dollars a year is lost alone by the Federal Government in public oil royalties to theft and accounting irregularities. *Washington Crime News Services, Security Systems Digest*, Feb. 10, 1982, Volume 13, No. 3, Page 8. The Federal royalty losses represent only the tip of the iceberg and estimates on the annual volume of crude oil stolen from oil field leases range from $2 billion to $6 billion dollars. *Congressional Record*, Dec. 14, 1982, E5115 and *World Oil*, March 1982, Page 5.

Traditional approaches to inhibiting crude oil thieves have been to lock and seal pipe line and tank connections, to hire armed security guards to regularly patrol the leases, and to vigorously prosecute all apprehended persons. In Texas, oil and gas producers have formed organizations such as the Texas Petroleum Industry Security Council, Inc., representing more than 10,000 independents, to develop group theft insurance plans as a measure to cope with the problem.

In a more recent approach to solving oil field thefts, tiny microdots are utilized to fingerprint oil in a particular storage tank. These microdots are typically the size of the capital "O" on a typewriter and include the name of the oil company, its lease number, its legal description, and other identifying information. Approximately 400 microdots are added to a tank of oil. In the event of theft, the proper legal authorities can obtain a sample of the oil and ascertain whether or not the oil contains microdots thereby ascertaining the true owner of the crude. The *Bakersfield, California*, Wednesday, May 12, 1982.

Problems comparable to the above described situation concerning crude oil theft also occur with theft of equipment, doctoring of records by personnel, malfunctioning of equipment, or losses due to disaster such as fire caused by lightening strikes and the like. No centralized, stand alone system or method for continuously monitoring and controlling the various parameters of oil lease equipment, for reporting such parameters, or for sounding an alarm when theft occurs, exists especially one adapted for the harsh environments of oil leases.

Recognizing the numerous problems associated with equipment in such remote oil leases, the inventors have developed an automated stand alone system and method for continuously monitoring and controlling oil lease equipment parameters such as crude oil production and purchase. For example, the present invention continuously measures the level of crude in the storage tanks and records production and purchase events in suitable printed tickets for use by applicable personnel and in long term computer memory for subsequent evaluation at a remote location. All such parameters are monitored by suitable transducers and processed by the system to eliminate human error in reading and recording. Furthermore, the system of the present invention is user friendly in that a human interface is provided between the system and the operator which requires a minimum amount of training. Furthermore, the system of the present invention is secure in that only authorized personnel can perform tasks with the oil lease equipment. Finally, the system of the present invention is protected from the harsh environmental conditions typically found in oil leases.

In the event of crude oil theft, the system of the present invention will detect unauthorized drops in the level of crude by means of an ultrasonic detector and signal an alarm so that proper enforcement can occur. With respect to the function of measuring oil levels in storage tanks with ultrasonic transducers, the inventors have conducted a patentability search, on their invention, the results of which follows:

| INVENTOR | U.S. Pat. No. | Date Issued |
|---|---|---|
| J. D. Baird | 3,553,636 | Jan. 5, 1971 |
| Austin et al | 4,170,765 | Oct. 9, 1979 |
| Joseph Baumoel | 4,203,324 | May 20, 1980 |
| Massa | 4,210,969 | July 1, 1980 |
| Hirsch et al | 4,212,201 | July 15, 1980 |
| Combs et al | 4,221,004 | Sept. 2, 1980 |
| Rosie et al | 4,229,798 | Oct. 21, 1980 |
| Dennis et al | 4,248,087 | Feb. 3, 1981 |
| Keidel et al | 4,264,788 | April 28, 1981 |
| Howard et al | 4,325,255 | April 20, 1982 |

In the 1981 patent to Dennis et al (U.S. Pat. No. 4,248,087), an ultrasonic transmitting transducer and an ultrasonic receiving transducer are coupled to the external walls of the tank in which the fluid resides and whose level is to be monitored. The transducers are magnetically coupled to the side walls of the tank and are oriented so that the direction of propagation of the ultrasonic energy is normal to the fluid's surface. A microprocessor is utilized to calculate the change in fluid level in the tank and this information is then displayed. Dennis contemplated that a general purpose computer could be substituted for the microprocessor and readings from a number of tanks could be made and displayed. The section in Dennis entitled "Description of the Prior Art" provides a general discussion of known acoustic or ultrasonic measurement techniques for determining fluid levels in tanks. Three types of prior art approaches are discussed by Dennis. The first type relates to a single ultrasonic transducer located at the top of the tank (or at the bottom of the tank) which emits an energy pulse normal to the surface of the fluid to detect the fluid air interface. A second type of measurement is provided by a transmitter located near the bottom of the tank with multiple acoustical receivers mounted on the sides of the tank. A third type of system utilizes a number of echo pulses transmitted down one side of a tank in a vertical line.

The 1980 patent issued to Rosie et al (U.S. Pat. No. 4,229,798), teaches the use of an elongated tube placed at, or close to, the bottom of the tank wherein a transducer is oriented so that the ultrasonic energy wave is propagated vertically upwards inside the tube to the surface of the liquid stored in the tank. Rosie ascertains the temperature of the stored liquid in order to calculate any variations to the propagated ultrasonic energy pulse due to environmental conditions and, based upon a mathematical relationship, ascertains the true position of the fluid level in the tank. A microprocessor is then utilized to receive the temperature measurements, the ultrasonic measurements, and to visually display the results. The Rosie configuration can be utilized to issue a warning alarm when a predetermined level in the tank is reached by filling the tank with oil. It is contemplated in Rosie that for large cylindrical bulk storage tanks, the transducer sensor unit can be mounted on the side of the tank adjacent its lower end to avoid the use of a tube and, therefore, a pivoting connection must be utilized to allow the transducer to be vertically aligned.

The 1980 patent issued to Combs et al (U.S. Pat. No. 4,221,004) relates to an adjustable ultrasonic level measurement device for use in measuring the depth of flowing liquid in a channel using an ultrasonic transducer located above the channel. Temperature of the ambient air above the channel is measured and variations in the temperature are utilized to adjust the circuitry of Combs to provide for accurate ultrasonic level readings.

The 1980 patent issued to Massa (U.S. Pat. No. 4,210,969) also utilizes a microprocessor system having an ultrasonic transducer located at the top of the tank and normal to the level of the fluid for ascertaining the actual level of the fluid. In Massa, a fixed target located at a known distance from the ultrasonic transducer is utilized to take care of velocity variations caused by the presence of chemical vapors or changes in temperature. The Massa approach calibrates each reading by measuring the velocity time between the transducer and the reference target prior to the taking of a measurement.

The remaining patents developed in the patentability search set forth a variety of other techniques and approaches utilizing ultrasonic transducers and other techniques to measure the level of fluid in a tank or other apparatus. However, none of the above prior art approaches nor any of the conventional approaches currently used in the oil and gas industry to prevent or hinder theft of crude from oil storage tanks contemplates the present invention. The present invention not only includes the measurement of fluid levels in oil storage tanks but provides for an overall oil field management system that monitors tank levels and the performance of other equipment parameters. Further, it includes the generation of appropriate records and reports for the operation of the oil lease and the maintenance of a history file on each piece of equipment. The present invention also permits authorized transfers of crude from oil storage tanks into tankers, records and monitors production into the tank and shuts off a tank when full, and alerts either locally or at a remote location a suitable alarm when unauthorized transfers of crude takes place. Furthermore, the modular nature of the system of the present invention permits other monitoring and supervision of oil field equipment in addition to measuring levels in storage tanks. For example, when the flame on the heater treater goes out, for whatever reason, the event will be recorded and the gas to the line will be shut off. Or, when the sucker rod breaks on the horse head pumper, the event will be sensed, recorded, an alarm issued, and the pump turned off before it causes additional damage. The present invention is further capable of communicating with a centralized location such as the headquarters of an oil and gas company so that an operator remote from the oil lease can directly access the system.

SUMMARY OF INVENTION

The oil field lease management and security system and method of the present invention monitors oil field equipment and communicates with authorized operators. The system of the present invention includes a plurality of transducers connected to the equipment for sensing operational parameters of the equipment such as fluid levels in oil field storage tanks, a plurality of controllers connected to the equipment for controlling operational components of the equipment such as determining when an oil tank is filled and activating a shut-off valve to prevent further filling of the tank, a communication access panel for allowing an authorized operator to interface with the system, and a monitoring system interconnected with the transducers, the controllers, and the communication access panel for periodically monitoring each of the transducers and the communication access panel wherein the monitoring system is capable of storing transducer information corresponding to the operational parameters from the transducers such as the levels of oil in the storage tanks and operator information from the communication access panel such as the operator's password and access code. The monitoring system based upon the stored information is able to ascertain whether an operator's interaction with the equipment is authorized and, if unauthorized, is capable of sounding a suitable alarm. For example, if an unauthorized operator attempts to remove oil from one of the storage tanks, an alarm signal is issued and an alarm is sounded. However, if the access to a storage tank to remove oil is authorized, the system records the event and generates a printed run ticket to the authorized operator as a receipt for his transfer or purchase of the oil.

The system of the present invention contemplates remote communications at a centralized location for communicating with the monitoring system in order to ascertain the operational status of the equipment and whether or not unauthorized access is occurring.

BRIEF DESCRIPTION OF THE DRAWING

FIG. 8 is a top planar view of the swivel mounting cap of the present invention, FIG. 9 is a side planar view of the swivel mounting cap illustrated in FIG. 8, FIG. 10 is a top planar view of the swivel mounting base of the present invention, FIG. 11 is a side planar view of the swivel mounting base of FIG. 10, FIG. 17 is a perspective illustration of the monitoring system (MS) of the present invention, FIG. 18 illustrates the removal of the electronic carriage of the present invention from the monitoring system of FIG. 17, FIG. 19 sets forth the top planar view of the electronic carriage of the present invention, FIG. 20 sets forth, in side planar view, the electronics carriage of FIG. 19 with the two covers removed therefrom, FIG. 21 sets forth the details of the communication access panel of the present invention as found in the monitoring system, FIG. 22 sets forth the electronic block diagram components of the interface control found at the monitoring system of the present invention, FIG. 23 sets forth the functional responsibilities of the user interface control circuit of the present invention, FIG. 24 sets forth the flow chart for the operation of the local sensing unit interface control circuit of the present invention, FIG. 25 is an illustration of the calibration of the ranging module shown in FIG. 15.

GENERAL DESCRIPTION

Figure 1:
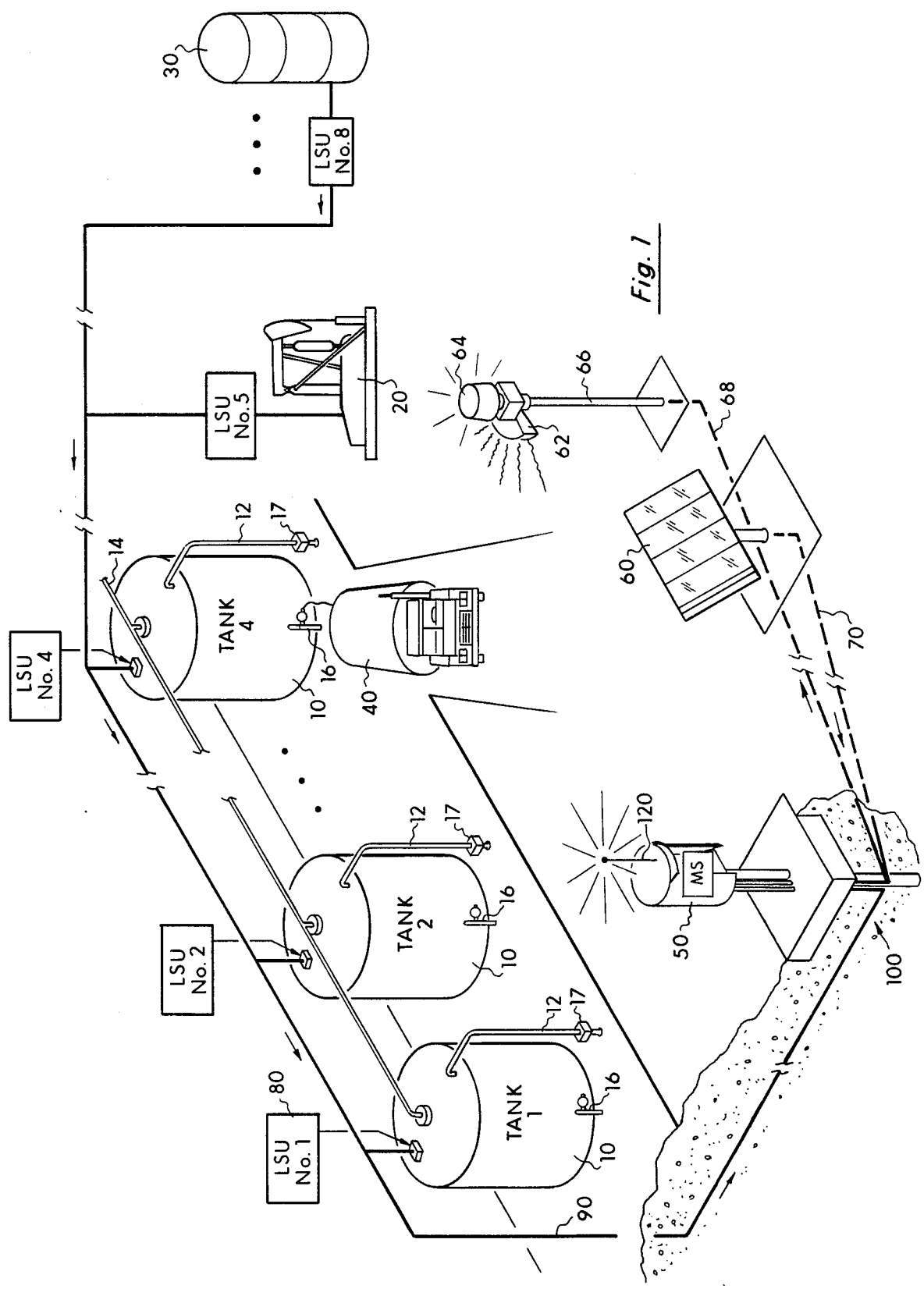
FIG. 1 sets forth, in perspective illustration, an oil lead containing oil field equipment including oil storage tanks incorporating the system of the present invention, FIG. 2 sets forth, in block diagram format, the remote communications aspects of the system of the present invention illustrating a communication link with the regional base computer system (RBCS) over conventional phone lines and the base monitoring station (BMS)
Figure 2:
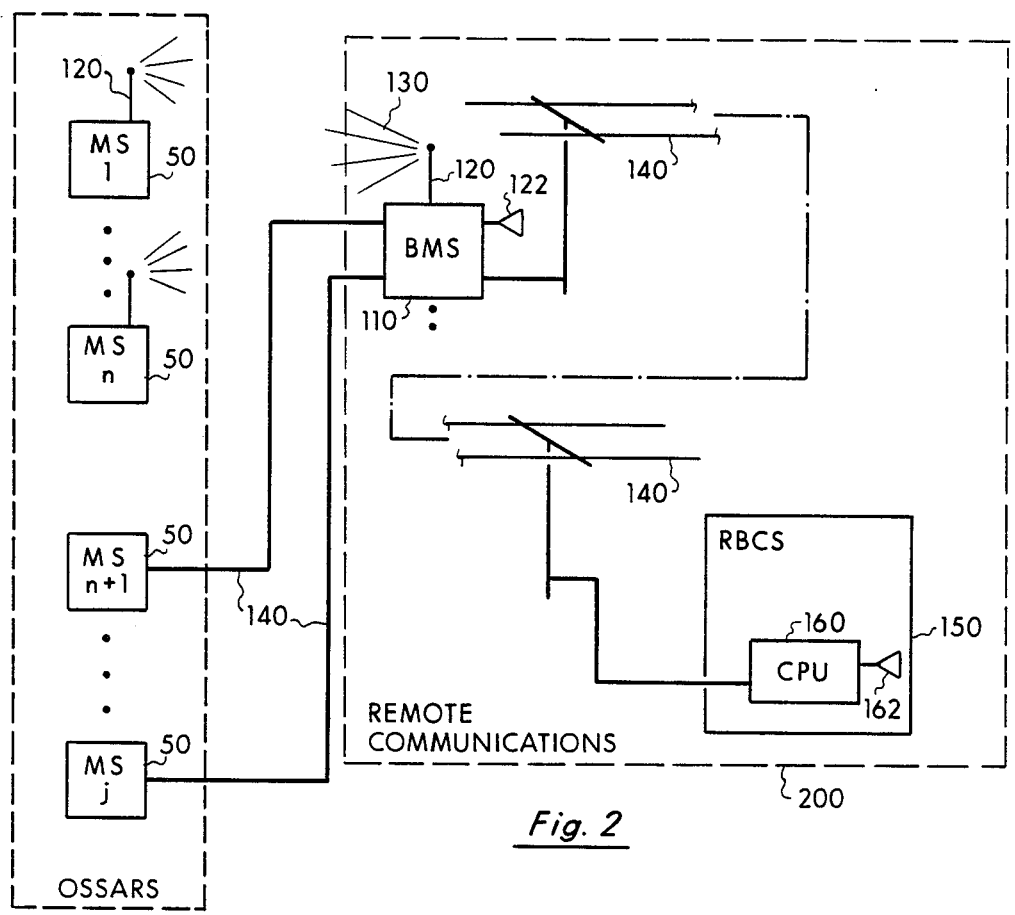

In FIGS. 1 and 2, the general components of the present invention are set forth for a typical remote oil lease configuration which includes a number of storage tanks 10, a number of horse head pumpers 20 and other miscellaneous production equipment such as, for example, a heater treater 30. The pumpers 20 deliver underground crude via lines 12 into tanks 10 for storage. An atmospheric vent line 14 is provided on the tanks to prevent pressure buildup. On a periodical basis, a truck 40 is used to transfer (i.e., purchase) crude oil from the storage tanks 10.

In FIG. 1, the system 100 of the present invention includes a monitoring system 50 powered by a solar generator 60, or other conventional power source, over cable 70, a number of local sensing units (LSU) 80 interconnected with storage tanks 10 and the other pieces of production equipment such as the horse head pumpers 20 and the heater treater 30. The local sensing units 80 interconnect with the monitoring system (MS) 50 by means of an underground cable 90. In operation, the local sensing units 80 detect various parameters of the equipment such as, for example, the rising levels of crude in tanks 10 due to delivery from the pumpers 20 over lines 12, the dropping levels of crude due to the purchase of crude by the tankers 40 over lines 16, the fuel levels in the fuel tanks for the pumpers 20 or the operation of the heater treater 30 such as determining whether the heater flame is on or not.

For the overall security of the oil lease and to prevent theft, the system 100 of the present invention authorizes the purchase of crude oil. The authorized driver of truck 40 accesses the system 100 at the monitoring system 50 with an appropriate access code and password. Once recognition is granted by the system, the driver can hook onto the authorized tank and make the transfer. The monitoring system gives the driver, after the transfer of crude into the tanker, a run ticket confirming the number of barrels taken, the time of pickup and all other relevant information. The transfer information is stored in the system as a historical record and delivered to a central system for processing. Any unauthorized transfer of crude will be immediately detected by the system and an alarm such as a siren 62 and a strobe light 64 mounted on pole 66 will be activated. Siren 62 and light 64 are also interconnected with the monitoring system over buried cable 68. Even if the transfer is authorized and the truck driver hooks onto the wrong storage tank, the alarms 62 and 64 will sound which would immediately cause the driver to re-access the system and to hook onto the correct tank.

In another mode of operation, the system functions to control the level of oil in the tank. When the tank 10 becomes full, this event is sensed and valves 17 become activated to prevent delivery of production oil over line 12 from the horse head pumpers into the tank.

In FIG. 2, a number of monitoring systems (MS) 50 of the present invention together termed "on site security and reporting systems" (OSSARS) conventionally communicate with a base monitoring station (BMS) 110. For example, and as shown in FIG. 2, the monitoring system 50 can communicate by means of a conventional radio link 120 with the remote base monitoring station 110 by radio waves 130 or by means of a telephone connection over telephone lines or another conventional means 140. Likewise, each of the base monitoring stations 110 communicates over conventional telephone lines 140 with a regional base computer system (RBCS) 150. The BMS 110 and the RBCS 150 collectively form the remote communications located some distance away from the OSSARS. The regional base computer system 150 of the present invention is designed to communicate with between one and five hundred monitoring systems at their respective remote locations. An operator at the regional base computer system 150 has the capability with computer 160, as will be further discussed, of remotely programming each monitoring system 50 and of communicating directly with each of the local sensing units 80 in order to receive operator and tank information concerning a particular storage tank 10 or other piece of production equipment 20 and 30. Each BMS 110 and RBCS 150 contain general purpose computers and appropriate data receiving and transmitting equipment which are conventionally available and whose function and design are well known.

In operation, the regional base computer system 150 is preferably located in the headquarters of an oil company, each base monitoring system 110 can be located in an oil field area covering several square miles, and the individual monitoring systems 50 would be responsible for its storage tanks in each of the several oil leases within the field.

In the event of an authorized taking of crude from a storage tank 10, the local sensing unit 80 for that tank detects a dropping in the level of crude and an alarm signal is generated which is sensed by the regional base computer 150 to activate an alarm 162 and by the base monitoring system 110 to activate alarm 122. In the implementation of the present invention, the operator can specify whether or not all alarms 62, 64, 122, and 162 should be used. For example the operator may desire not to use an alarm at the oil lease and rely only on alarms located at the base monitoring system 110 and the regional base computer system 150. Alarms 122 and 162 can be conventional alarms such as buzzers, lights, or beepers. Once the alarm signal is issued under the teachings of the present invention, it is to be understood that conventional processing techniques in BMS 120 and RBCS 150 can be used to detect the signal and sound the alarms. For example, a conventional available beeper on a patrolling security guard can be called by CPU 160 or BMS 120 to be immediately dispatched to the oil lease originating the alarm condition. In normal operation, however, the purchase of crude and the production of crude at an oil lease can be conveniently monitored from the regional base computer 160.

Figure 3:
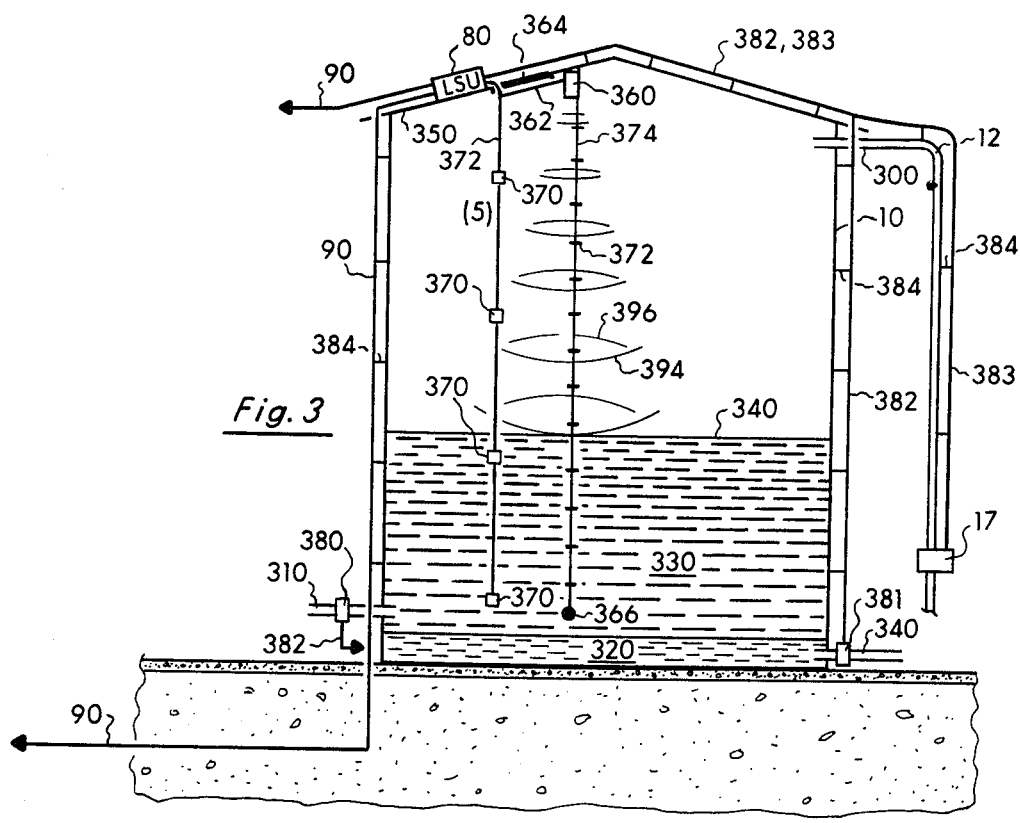
FIG. 3 is a side cross-sectional illustration of a conventional storage tank incorporating the level transducer, the temperature transducer, and the flow transducers of the present invention, FIG. 4 sets forth the state table for the operation of the monitoring system (MS) servicing a local sensing unit (LSU) of the present invention.

In a typical oil field storage tank as shown in FIG. 3, the storage tank 10 includes an inlet 300 on delivery pipe 12 through which incoming crude oil is delivered over pipe 12 into storage tank 10. Tank 10 also includes an outlet pipe 310 for removal of crude from the storage tank over line 16. Since water is often intermixed with crude coming from the ground, the water 320, being immiscible with oil, typically forms a separate and lower layer 320 from the oil 330 and is removed through a water outlet pipe 340. The level of oil 340 within the storage tank 10 varies in time, based upon delivery of incoming crude oil through inlet 300 from pumper 20 and transfer of crude through outlet 310 by the tanker truck 40.

Under the teachings of the present invention, the local sensing unit 80 is affixed to the roof 350 of storage tank 10 and communicates with an ultrasonic level detector 360 over cable 362 and with four temperature sensors 370 over cable 371. The ultrasonic detector, as will be discussed, is calibrated by means of a series of reflectors 372 located on string 374, such as a nylon string, and held in position by weight 366. The local sensing unit 80 also communicates with two flow indicators 380, 381 over cable 382 and with the shut off valve 17 over cable 383. Cables 90, 382 and 383 are conventionally attached to the sides of the storage tanks 10 by means of a number of standoffs 384 or other holders. In this arrangement, the local sensing unit 80 is capable of determining the temperature of the crude within the storage tank 10, the level 340 of the crude oil 330 within the tank by means of ultrasonic waves 394 and reflections 396 therefrom, whether crude is flowing from outlet 310 by means of flow indicator 380, whether water is flowing by means of a second flow indicator 381 and whether crude is flowing into the tank through inlet 300 by sensing the rising level 340. It is important to note that the transfer of crude can be detected by sensing the drop in the level of crude without the necessity of using flow indicators and, therefore, their use is optional and serves as a double check to verify, for example, the existence of leaks in the system. Finally, when the tank is full (i.e., reaches a predetermined level), shut off valve 17 is activated to prevent further filling.

Figure 4:
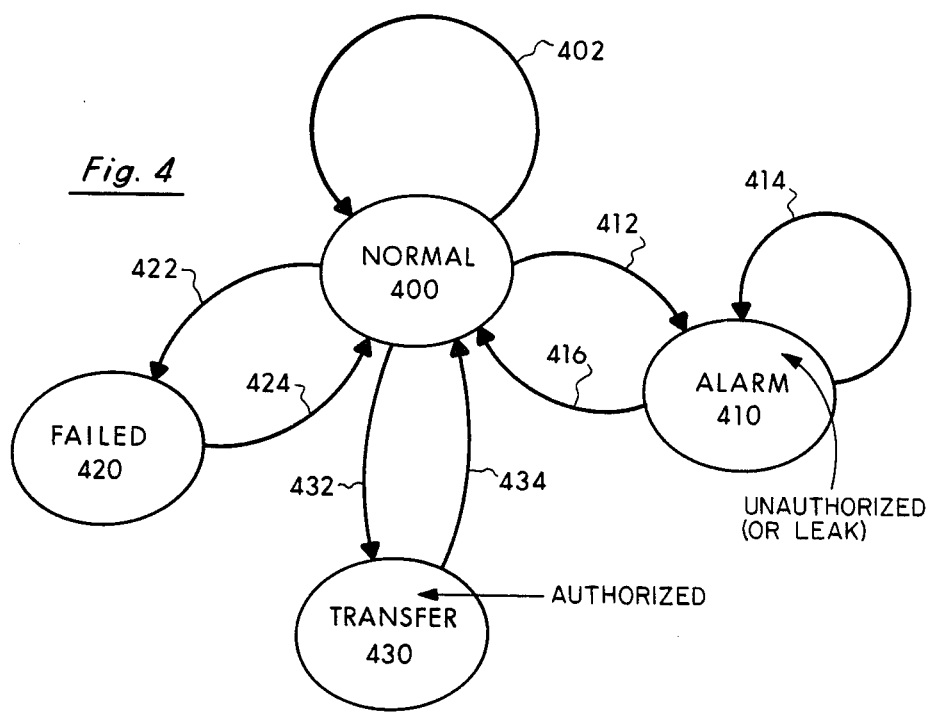

In FIG. 4, the state table diagram showing the operation of the monitoring system 50 servicing the sensing unit 80 is set forth. In the normal operation state 400, monitoring system 50 accesses each local sensing unit 80 periodically such as, for example, every five minutes to ascertain the level 340 of the crude oil in storage tank 10 and to take a statistical measurement of the temperature within the tank. As long as level 340 stays the same, the system remains in loop 402. However, it the level 340 commences to drop in comparison to the last level reading made by the local sensing unit 80 and the drop is not anticipated by the system (i.e., an unauthorized transfer of crude or a leak), the system enters an alarm state 410 over path 412. The system 100 of the present invention then continuously monitors the level 340 in path 414 and records data, for historical purposes, in appropriate memory data banks, and notifies security by either sounding an alarm 62 and 64 at the oil lease or by activating alarms 122 and 162 at the base station 110 and the regional base computer system 150. If the level 340 stabilizes while the system 100 is in the alarm state 410, the system cycles over path 416 back into the normal state 400.

If the system of the present invention is in the normal state 400, and the monitoring system 50 attempts to access the local sensing unit 80 on a particular cycle, but no response comes back from the local sensing unit 80, the system enters path 422 into a failed state 420. At this time, the monitoring system 50 will attempt to access the local sensing unit 80 a predetermined number of times, such as two additional times, to see if a response will occur. If a response does occur, the system will cycle over path 424 back into the normal state 400. However, if after the additional inquiries, the local sensing unit 80 still does not respond, historical data concerning the event is stored in memory and the system, with respect to that tank, and will stay in the failed state 420 until cleared at which time it will cycle over path 424 back into the normal state 400.

When the system of the present invention is in the normal state 400, any authorized user who seeks to transfer crude from storage tank 10 through outlet 310, must access the monitoring system 50 with a proper access code and password. Upon recognition of that access code and password, the system cycles from the normal state 400 over path 432 into a transfer state 430 to monitor the dropping level and to monitor the flow indicators 380 and 381. At this time, the user transfers crude from tank 10 into truck 40 and the local sensing unit 80, by means of the ultrasonic detector 360, ascertains the quantity of oil purchased by the user and the temperature of the oil (which is necessary to ascertain the true quantity of oil). When the user logs off on the monitoring system 50 at the completion of the transfer, or in the event that the level of the crude stabilizes for a period of time such as ten minutes, the system will cycle back over path 434 into the normal state .

It is clear, therefore, that authorized access into system 100 of the present invention provides for an accurate measurement of crude removal from an individual tank and provides significant record keeping data concerning such removal back to a central location such as the regional base computer system 50. However, in the event that theft of crude occurs, the system cycles into state 410 and provides suitable alarm indications either at the oil lease itself or at a remote location. Additionally, in the event of malfunction, the system will appropriately enter into a failed state 420 and also provide such information to a remote or regional center 150 for servicing.

Although the system and method of the present invention is primarily designed to monitor and to control activities concerning the amount of crude oil in individual storage tanks, it is to be expressly understood that the local sensing unit 80 can serve to monitor operational parameters and to control operational components of other equipment in the oil lease such as, for example, horse head pumpers 20 and heater treaters 30.

Figure 5:
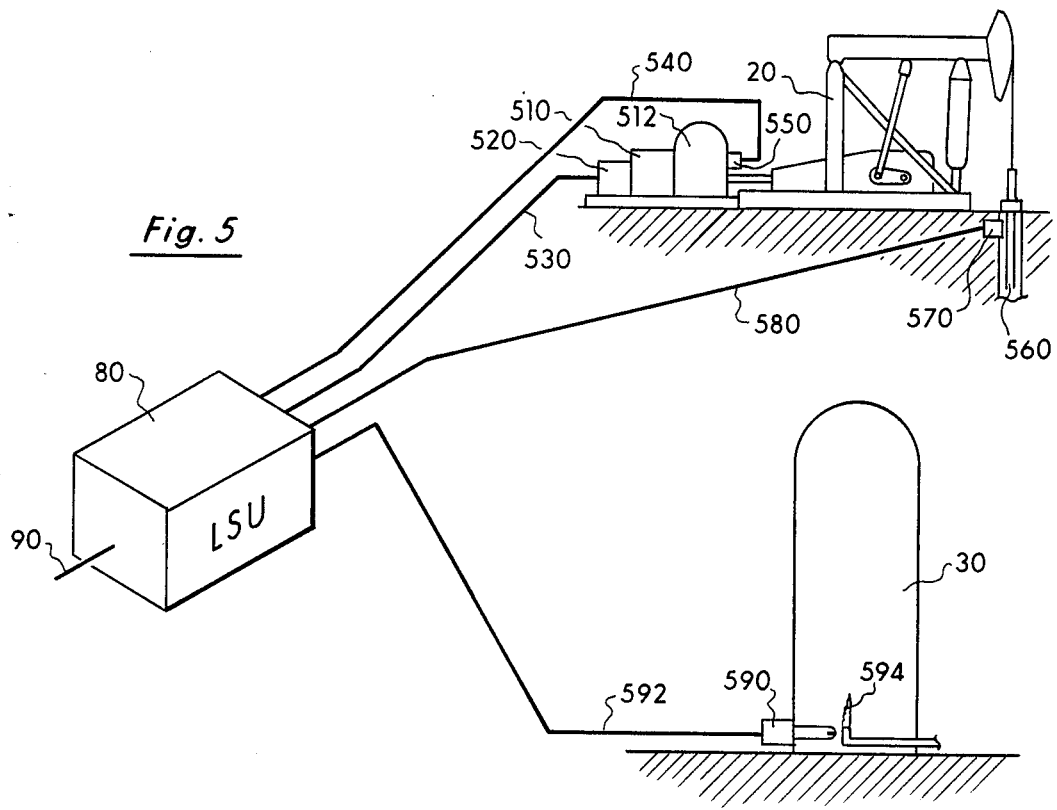
FIG. 5 is an illustration of the present invention performing other oil lease tasks such as sensing the operational parameters of a gas powered horse head pumper and a heater treater, FIG. 6 sets forth the side view of the ultrasonic level detecting transducer of the present invention mounted to the underside of the roof of a storage tank, FIG. 7 sets forth, in an exploded side planar view, the various components of the transducer illustrated in FIG. 6.

As shown in FIG. 5, for gas driven horse head pumpers 20, the remote sensing unit 80 can measure the level of gas by means of a transducer connected to the gas tank 510 on the motor 512. When the gas in the tank 510 empties, the transducer 520 will detect that condition and extend a suitable signal to LSU 80 over cable 530. The LSU 80 through control of the monitoring system 50 can then shut down pumper 20 by sending a shut-down signal over cable 540 to a shut off switch 550 on the motor 512 in order to shut the motor off before completely running out of gas. Likewise, LSU 80 can sense the breakage of the sucker rod 560 with proximity sensor 570 over cable 580 and shut down the pumper 20 by switching off the motor 512 with switch 550 before further physical damage can be done. In the case of heater treater 30, LSU 80 receives a signal from a thermocouple sensor 590 over cable 592 when the heater treater flame 594 goes out. The monitoring system 50 can then inform the operator of the lease by sounding alarm or by providing a maintenance condition report.

Other oil lease equipment operational parameters can be monitored and operational components of the actual equipment controlled under the teachings of the present invention. For example, the gas pressure in a well head can be monitored and the field equipment shut down if the pressure exceeds a dangerous level, the flow through a gas pipeline (like the level of crude in a storage tank) can be continuously monitored and tickets printed showing production, the operation of the oil and gas separators can be monitored and controlled, and fire caused by lightening strikes can be sensed and an alarm sounded. In short, numerous operational monitoring and controlling functions, as well as management and reporting, of the oil lease equipment can occur under the teachings of the present invention.

Under the preferred method of the present invention, as will be discussed in more detail in the next section, operator communication signals are converted into corresponding electrical signals by the monitoring system 50 to authorize access to the oil field equipment, such as authorizing transfer of crude from a storage tank. The LSUs 80 sense the various operational parameters of the equipment such as the authorized transfer of crude by sensing level drops occurring after the operator receives authorization. Of course, in the event of an unauthorized transfer an alarm 62 is sounded; and, in the event of either authorized or unauthorized access to the equipment, suitable operator and equipment information is processed and recorded. Furthermore, under the method of the present invention operational components, such as shut-off valve 17, can be controlled.

DETAILED DESCRIPTION OF THE PREFERRED EMBODIMENT

1. The Local Sensing Unit (LSU) 80 Transducers and Controllers

The local sensing unit (LSU) 80, in one portion of the preferred embodiment, measures various parameters of an oil storage tank 10 and, as shown in FIG. 3, the LSU 80 can measure the level 340 of crude oil product 330 stored in the tank 10 by means of an ultrasound transducer 360, the temperature of the oil within the storage tank 10 by means of four temperature sensors 370, whether or not crude oil or water is flowing out from the tank 10 by means of dual flow indicators 380 and 381, and closing the shut off valve 17 when the crude reaches a predetermined fill level.

Figure 6:
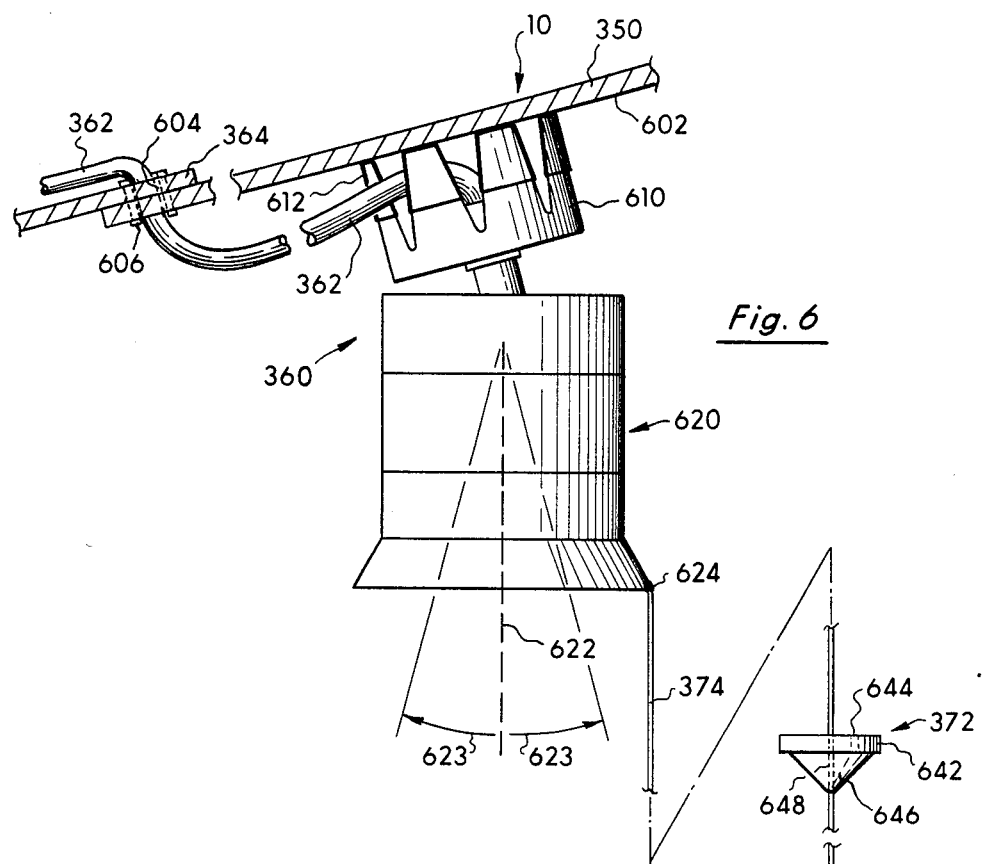

In FIG. 6, the ultrasonic transducer 360 of the present invention is mounted to the underside 602 of roof 350 of storage tank 10 by means of a castellated shaped cylindrical magnet 610. Magnet 610 is conventionally available from: Bunting Magnetics Co., 500 South Spencer Avenue; and Newton, Kans. 67114, No. SP-942. The ultrasonic detector 360 contains a main housing 620 which is pivotally connected to magnet 610 by means of a ball joint so that housing 620 can be aligned vertically along line 622. In reference back to FIG. 3, the standard thief hatch 364 of oil tank 10 can be opened and transducer 360 can be magnetically attached to underside 602 with the housing 620 oriented to be directed vertically downward. The use of a magnetic coupling to roof 602 eliminates other conventional connections such as drilling that may cause the explosive vapors within the tank 10 to ignite. Furthermore, a thin coating of rubber 612 is applied to the castellated end of magnet 610 to further prevent the generation of any sparks upon attachment. The cable 362 from the housing 620 is fed through one of the holes 604 in the thief hatch cover 364 and properly sealed with a grommet 606.

The transducer housing 620 is aligned along line 622 by attaching a null indicator to the transducer and then continuously activating the transducer while adjusting it around line 622. When the transducer is manually aligned, as indicated by arrows 623, along line 622, the output of the transducer will give a minimum distance reading to the level of the oil. Any other alignment will give a larger distance reading for the same level.

Attached to the edge of the transducer housing 620 by means of a screw 624 is a nylon string 374 having a number of reference disks 372 disposed thereon at constant predetermined spacings such as precisely every two feet from the housing 620. Each reference disk 372 is preferably one inch in diameter, formed from plastic, and has an upper cylindrical portion 642 with a flat reflective surface 644 and a bottom cone-shaped portion 646. A hole 648 is formed through the integral disk 372 and press-fittingly engages string 364. At the bottom of the string 374 is attached a suitable weight 366 for holding the string vertically. The combined weight of the string 374, disks 372, and weight 366 is such as not to affect the aforesaid alignment of the transducer.

In FIGS. 7 through 13, the details of the preferred embodiment of the ultrasonic transducer 360 is shown. In FIG. 7, the transducer includes magnet 610, a swivel bolt 700 having a spherical head, a swivel mounting cap 710, a swivel mounting base 720, a transducer carrier 730, the transducer 740, and a transducer carrying cap 750 with an acoustic accumulator 760. The swivel bolt 700 has an upper threaded portion 701 terminating in a stop 703 and a region 705 to provide sufficient spacing between stop 703 and sphere 707 to permit alignment of the transducer as shown in FIG. 6 with respect to magnet 610.

In FIGS. 8 through 11, the details of the swivel mounting cap 710 and 720 are shown. Four cap screw mounting holes 800 are formed in the swivel mounting cap 710 as well as a hole 810 partially spherically shaped located in the center of the swivel mounting cap 710. The swivel mounting base 720 shown in FIGS. 10 and 11 also has four holes 1000 drilled partway into the base and a center hole 1010 the upper portion of which 1100 is partially spherical in shape and the lower portion of which 1110 is cylindrical in shape. Additionally, two opposing cap screw holes 1020 are drilled through the base 720 and are designed to receive cap screws.

The swivel bolt sphere 707 engages the corresponding spherical cavity formed by the shaped holes 810 and 1100 in the swivel mounting cap 710 and base 720, as shown in FIG. 7, and four cap screws 712 are utilized to mount the swivel mounting cap 710 to the base 720 around the swivel bolt 700. The swivel bolt 700 has a hole 702 drilled therethrough which is receptive of one end of cable 362. The swivel bolt 700 is held firmly to the magnet 610 through a centrally located formed hole 611 in magnet 610 by means of nut 708.

Figure 12:
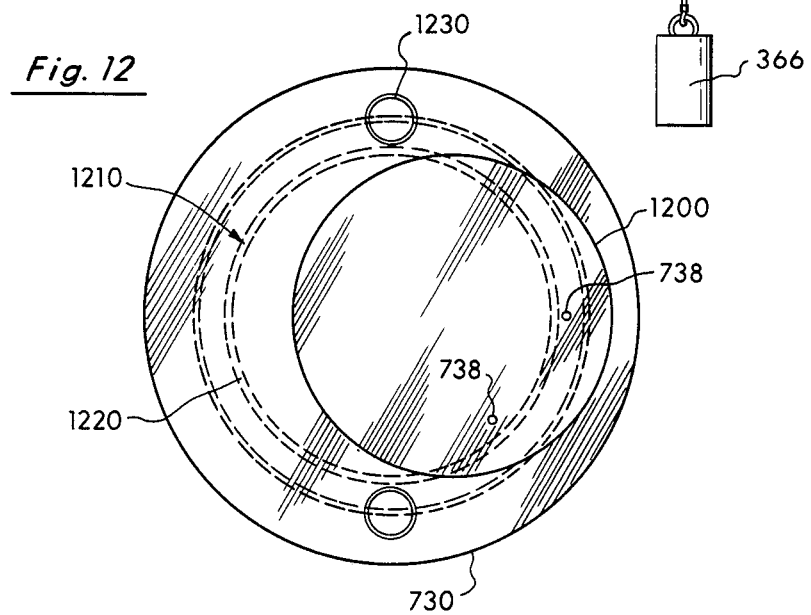
FIG. 12 is a top planar view of the upper portion of the transducer carrier of the present invention.

The transducer carrier cap 750 has a formed cavity 752 circular in shape and centered in cavity 752 is an opening 754, also circular in shape. Between the opening 754 and cavity 752 is a defined circular shoulder 756. A neoprene gasket 758 conforms to and rests on shoulder 756 and transducer 740 seats on it. A second neoprene gasket 762 is placed over transducer 740. The transducer carrier 730 threadedly engages cavity 752 with downwardly extending portion 732. Two transducer electrical connectors 734 abut the transducer 740 at electrical contact points 736 and are oriented upwardly through the transducer carrier 730 in holes 738. As shown in FIG. 12, the two formed holes 738 are positioned in the transducer carrier 730 based upon the design parameters of the transducer 740. The transducer carrier has a first cylindrical cavity 1200 offset from center and a second cylindrical cavity 1210 having a shoulder 1220. The second cavity 1210 is centered in the bottom 732 of the transducer carrier 730 and the first cavity 1200 is formed in the upper portion thereof.

The transducer carrier 730 is screwed into the transducer carrier cap 750 with the gaskets 758 and 762 and the transducer 740 in place to form a transducer housing. The transducer connectors 734 provide electrical paths between the contacts 736 of the transducer 740 and the cavity 1200. The ends 704 of the cable 362 which are delivered down through the center of nut 708, the hole 702 in the swivel bolt 700 and through the hole 1110 of the swivel mounting base 720 and are soldered to the conductor ends 735 of the transducer conductors 734 extending upwardly in cavity 1200. To eliminate the risk of fire or explosion in the tank 10, the entire cavity 1200, after the ends 704 are soldered to the ends 735, is filled with dielectric epoxy potting to cover and insulate all exposed metal. The swivel mounting base 720 is then attached to the transducer carrier 730 by means of cap screws 714 which engage formed holes 1230 in the transducer carrier 730.

The transducer 740 is an electrostatic transducer-instrument grade conventionally available from: Polaroid Corporation, 1 Upland Road, Norwood, Mass.

02062. In this fashion, the transducer 360, as shown in FIG. 6, can be readily fabricated to provide a housing 620 which will not generate any electrical sparks or shorts for the hazardous environment within the tank 10. Furthermore, the housing 620 can be vertically oriented along line 622 because of the pivotal relationship provided by the swivel bolt 700 and the magnet 610. The cable 362 exits the ultrasonic transducer assembly 360 through formed V-shaped slots 706 in the magnet 610.

The remaining transducers for LSU 80, as shown in FIG. 3, are conventionally available. In the preferred embodiment, the flow indicators 380 and 381 are strap-on sensors which can be easily retrofitted to existing oil field plumbing such as those made by: SENSIFLOW, 801 Dexter Avenue North, Box C19074, Seattle, Wash. 98109, as Model No. SF10/15. Furthermore, the temperature sensing units 370 are of the current voltage type and are also conventionally available units such as those made by: Intersil Co., 10710 North Tanton Avenue, Cupertino, Calif. 95014, Model AD590. The cutoff switch 17 can be any readily available solenoid pipe valve.

2. The Local Sensing Unit (LSU) 80

FIGS. 13 through 16, set forth the details of the electronics in the local sensing unit 80. LSU 80 functions to receive various analog or digital inputs from transducers or sensors 360, 370, 380 and 381, to process that information, and to communicate with the monitoring system 50. LSU 80 also functions to deliver control signals to the equipment such as valve 17.

Figure 13:
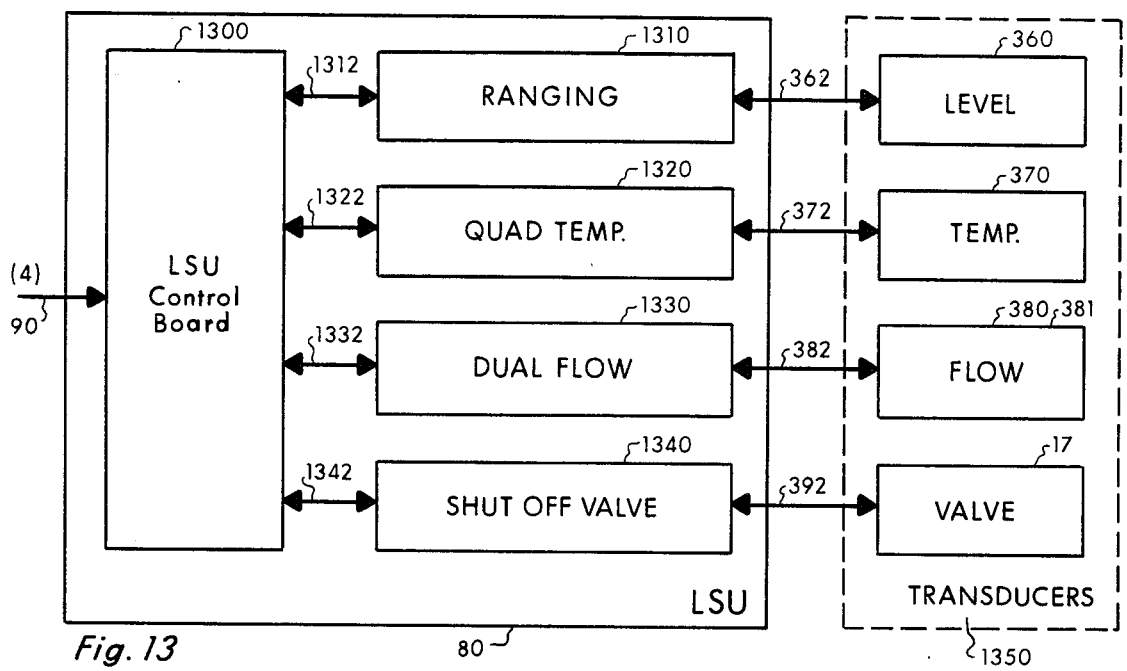
FIG. 13 is a block diagram representation of the various electronic components found in the local sensing unit of the present invention.

In FIG. 13, the level sensing unit 80 includes an LSU control board 1300, a ranging module 1310, a quad-temperature module 1320, a dual flow module 1330, and a shut off valve module 1340. The ranging module 1310 is interconnected to the control board over bus 1312 and communicates with the level transducer 360 over lines 362. The quad-temperature module 1320 communicates with the LSU control board 1300 over bus 1322 and communicates with the four temperature sensors 370 over lines 372. The dual flow module 1330 communicates with the LSU control board 1300 over bus 1332 and also receives analog signals from the dual flow transducers 380 and 381 over lines 382.

It is to be expressly understood that although a four port or four module circuit is shown in FIG. 13, more or less than four ports could be used according to the teachings of the present invention. In FIG. 13, three ports are utilized for sensing: fluid level, temperature, and flow. Other parameters in the tank could also be sensed and measured. For example, module 1340 could be utilized to determine the specific gravity of the oil product 330 in the tank 10 when interconnected with a specific gravity sensor or to determine the presence of fire when interconnected with a fire sensor. Additionally, when LSU 80 is used in the configuration shown in FIG. 5, the various modules 1310, 1320, 1330, and 1340 could be modified to access the fuel tank level indicators for the four fuel tanks of the four horse head pumpers 20. It is to be expressly understood that the modular relationship shown in FIG. 13 allows LSU 80 of the present invention to be suitably adapted to measure oil field equipment parameters and to report those parameters back to the monitoring system 50 in an oil patch, to a base monitoring system 110, or to the regional base computer system 150. The group of transducers 1350 in FIG. 13, therefore, could be any suitable transducer for measuring an oil field parameter. The purpose of LSU 80 is to receive via separate modules transducer information, and to communicate that information to the monitoring system 50 or to communicate directly with the regional base computer system 150.

In FIG. 13, however, module 1340 is used to control the operation of equipment such as, for example, shut off valve 17. Hence, depending on the operator's requirements and equipment, the modules 1310, 1320, 1330 and 1340 can be configured under the teachings of the present invention to monitor and then control oil lease equipment in a wide variety of different combinations.

Figure 14:
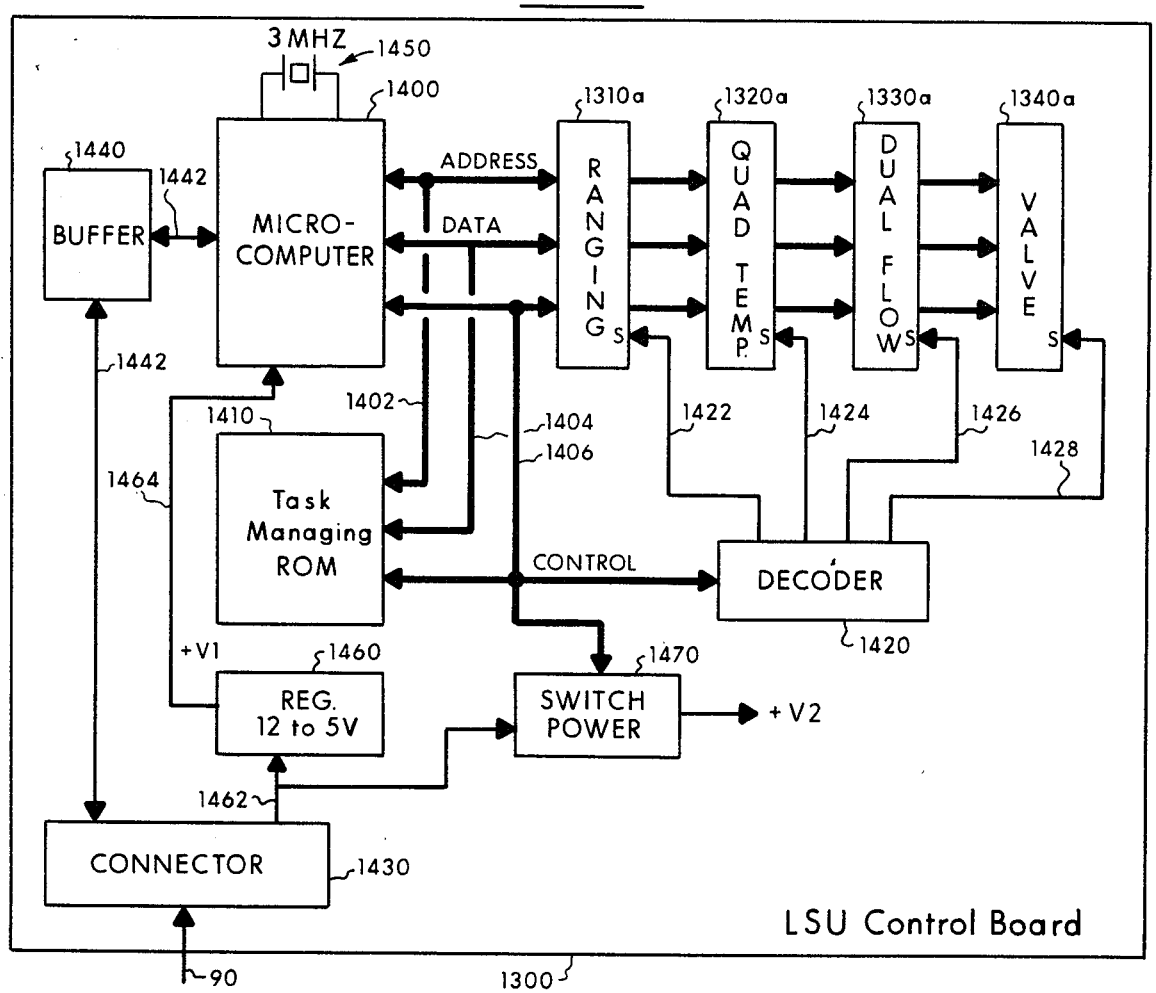
FIG. 14 is a detailed block diagram representation of the electronic local sensing unit central board module of the present invention.

In FIG. 14, the details of the LSU control board 1300 are set forth to include a microprocessor 1400, a task managing EPROM 1410, and a decoder 1420. The LSU control board 1300 is connected by means of connector 1430 to underground cable 90 which is interconnected with the monitoring system 50. The connector 1430 extends signals from cable 90 to a buffer 1440 by means of leads 1442. The buffer 1440 is conventional and available from: National Semiconductor Corporation, 2900 Semiconductor Drive, Santa Clara, Calif. 95051, Model 74C244. Buffer 1440 serves to buffer and to isolate LSU control board 1300 from any extraneous noise signals or pickup appearing on cable 90. The output of buffer 1440 is delivered over lines 1442 to microcomputer 1400. The microcomputer is a single component eight-bit chip conventionally available from: Intel Corporation, 3065 Bowers Avenue, Santa Clara, Calif. 95051, Model 8031.

The microcomputer 1400 utilizes a conventional 3 MHz clock 1450 for timing. The microcomputer 1400 is interconnected to an ADDRESS bus 1402, a DATA bus 1404, and a CONTROL bus 1406. The microcomputer 1400 also receives power over lines 1464 from regulator circuit 1460 which is interconnected over lines 1462 to connector 1430. The regulator 1460 functions to provide suitable power V1 for the operation of the microcomputer 1400 in a manner to be subsequently described. The microcomputer 1400 also communicates over the ADDRESS, DATA and CONTROL buses (1402, 1404, 1406) with a task managing erasable programmable read only memory (EPROM) 1410, and with each of the modules 1310, 1320, 1330 and 1340 over connectors 1310a, 1320a, 1330a and 1340a respectively. EPROM 1410 is conventionally available from Intel Corporation as Model 27C32A which is a 32,768 bit ultraviolet erasable and electrically programmable read only memory. For full production models of the present invention suitable read only memories can be utilized.

A switched power circuit 1470 is also interconnected to line 1462 from connector 1430 and provides power V2 to the buses and to the remaining components in the LSU other than microcomputer 1400. The switched regulator 1470 is controlled by a signal appearing on the CONTROL bus 1406.

The decoder 1420 is interconnected with the task manager EPROM 1410 over the CONTROL bus 1406 and decodes the data appearing on a portion of the CONTROL bus into a select one-out-of-four decode over lines 1422, 1424, 1426 and 1428 and accesses the select pin on the connectors for modules 1310, 1320, 1330 and 1340.

In operation, the LSU control board 1300 functions as follows. Signals are delivered over underground cable 90 from the monitoring system 50 into the connector 1430. In a preferred embodiment, four wires are utilized in cable 90. Two wires for signaling are delivered to the buffer 1440, the remaining two wires, power and ground, are delivered to the regulator 1460 and the switched regulator 1470. Upon receipt of suitable commands from the monitoring system 50, the microcomputer 1400 becomes activated and based upon those commands performs different tasks. The instructions for these tasks are stored in EPROM 1410 and the microcomputer 1400 conventionally accesses EPROM 1410 to retrieve these instructions. Based upon the particular instructions selected, the decoder 1420 selects which one of the modules 1310, 1320, 1330 or 1340 is to be accessed by activating the select leads over lines 1422, 1424, 1426, or 1428. As will be further explained, once the appropriate module is selected, the computer based upon the instructions in EPROM 1410 communicates directly with that accessed module in order to obtain data concerning its particular transducer 1350. Once that data is obtained, the computer will deliver the information in binary format through the buffer 1440 back onto cable 90 to monitoring system 50.

One goal of the present invention is to minimize the power requirements of the LSU in order to save energy. The regulator 1460 and the switched regulator 1470 accomplish this function. When the LSU 1300 is not being utilized all power to the LSU over cable 90 is turned off. When the monitoring system (MS) 50 communicates with the LSUs 80, power is delivered over cable 90 to all LSUs. However, at this time, the microcomputer 1400 is in a "sleep" mode which is a mode involving delivery of power only to a portion of the computer circuit 1400 which is powered by power appearing on line 1464; and, the remaining portion of the microcomputer 1400 and all of the rest of the electronics on the LSU control board 1300 as well as all the electronics on the ranging, quad-temperature, dual flow and valve modules 1310, 1320, 1330 and 1340 do not have power delivered to them during this sleep mode. In the sleep mode of operation, the computer is capable of monitoring lines 1442 and in the event the monitoring system 50 requests that this particular LSU control board 1300 become awakened, the microcomputer 1400 will issue a control signal on bus 1406 to the switched regulator 1470 causing it to become activated and to deliver power to all of the remaining electronics in the LSU 80. In this fashion, only when the LSU is in the awakened state or active state, does the primary consumption of power occur. At all other times, LSU 80 is either unpowered or asleep requiring only minimum power. In the preferred embodiment, the LSU does not consume power until it enters the sleep or active states and, during the sleep state, only 3.42 ma is consumed and during the active state 600 ma is consumed. Thus, the monitoring system 50 does not deliver power to the numerous LSUs in the oil lease until it desires to interrogate all LSUs. At this time all LSUs are put into the sleep mode and, since only one LSU communicates with the MS at a time only the particular LSU addressed becomes activated. In this fashion power requirements for the system are substantially minimized.

Figure 15:
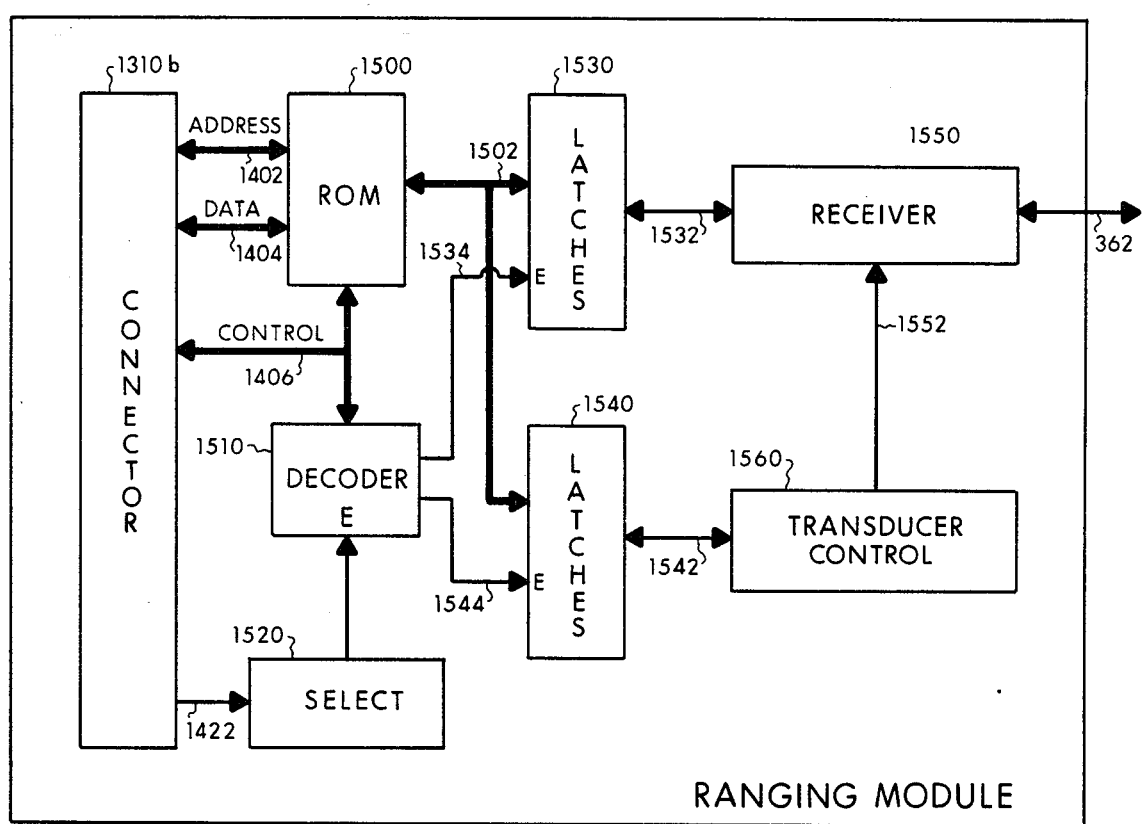
FIG. 15 is a detailed block diagram representation of the electronic ranging module of the present invention.

In FIG. 15, the details of the ranging module 1310 are set forth and includes an instruction read only memory 1500, a decoder 1510, a select circuit 1520, latches 1530 and 1540, and a receiver circuit 1550 and control circuit 1560.

The ranging module 1310 interconnects with connector 1310a on the LSU control board 1300 at connector 1310b. The ADDRESS bus 1402, the DATA bus 1404 and the CONTROL bus 1406 are each delivered into the ranging module 1310. In addition, the select signal from decoder 1420 on the LSU control board 1300 is delivered over line 1422 into select circuit 1520. Resident on the ranging module 1310 is the instruction read only memory 1500 which can be controlled by the microcomputer 1400. The read only memory 1500 is interconnected over bus 1502 with latches 1530 and 1540. In the preferred embodiment, the instruction ROM 1500 is the same as EPROM 1410.

The latches 1530 are interconnected with the receiver 1550 and over lines 1532 and with the decoder circuit 1510 over lines 1534. The latches circuit is a conventional octal latch with registers and buffers and is conventionally available from: Intel Corporation as Model I8282. The second latches circuit 1540 is also interconnected over bus 1502 with ROM 1500, is connected over lines 1542 with the transducer control circuit 1560 and over line 1544 with the decoder 1510. Latches 1540 is the same type as latches 1530. Bus 1502 is directly interconnected to DATA Bus 1404 and ROM 1500 is under control of microcomputer 1400.

The receiver circuit 1550 communicates with the level transducer 360 over lines 362 and is further interconnected with the transducer control circuit over lines 1552. The transducer control and receiver 1550 and 1560 are conventionally available as Model Nos. SN28825 and SN28826 manufactured by: Texas Instruments Inc., 6000 Denton Drive, Dallas Tex. 75222.

In operation, the ranging module 1300 functions as follows. When the LSU control board 1300 comes alive or awakens, power is provided to the ranging module circuit 1310 by switched regulator 1470. The microcomputer 1400 then activates the decoder 1420 on the LSU control board 1300 and a select signal is delivered over lead 1422 to the select circuit 1520. The select circuit 1520 enables decoder 1510 to operate. Data appearing on the CONTROL bus 1406 is decoded by the decoder 1510 to enable either lines 1534 or lines 1544. These lines enable the latches circuits 1530 and 1540 to become operative and to store data from ROM 1500. The data entered into the latches 1530 and 1540 control the operation of the receiver and control circuits 1550 and 1560 in a conventional fashion. Under control of ranging module 1310, the level transducer 360 steps through, in the preferred embodiment, a sequence of steps to ascertain the precise level 340 of the crude oil 330 in the storage tank 10 to an accuracy of within an eighth of an inch within a range from 0.9 ft. to 35 ft. Once level 340 has been ascertained, the analog signal appearing on lines 362 is digitized, delivered over lines 1532, and stored in latches 1530 for delivery by the microcomputer 1400 to the monitoring system 50.

In operation the ranging module 1310 measures the level of oil in the tank as follows. First, calibration must be made before each measurement to correct for sound propagation delays or changes due to the various layers of gas between the transducer and the oil and other environmental conditions. Such calibration is made possible by reflecting pulses off reference disk 372 dispossed at predetermined distances along string 374. The spacings between each disk and the transducer 740 is fixed and is a known distance.

As mentioned, the transducer 740 is controlled by microcomputer 1400 on the LSU control board and three separate time intervals are provided: overall time, blanking time, and window time. The overall time interval is the time between the transmitted pulse and the received echo from the oil, the blanking time is the time when the transducer 740 is not looking for an echo, and the window time is the time when transducer 740 is looking for an echo. The three timers are designated T0, T1, and T2 and are used to determine the overall time, the blanking time, and the window time, respectively.

As shown in FIG. 25, the transducer 740 sends out a pulse 394. Timer T1, loaded with a value equal to the blanking time commences to down count to zero and the microcomputer 1400 does not read any values from transducer 740 during this time. When timer T1, counts to zero, the second timer T2, starts and defines a specific window of time to look for echo 396a which is reflected off of the first reference disk 372a. During time T2, the computer analyzes the signals coming from transducer 740 looking for receipt of the echo 396a. When the reflected pulse 396a is received, the computer, knowing the actual distance between the transducer 740 and the first reference disk 372a, corrects for the effects of the atmosphere on transmission by adjusting the overall counter T0 to reflect the actual time for the acoustic pulse 394 and echo 396a to travel the known distance to and from the first disk 372a.

The computer then adjusts the next blanking time $T1_2$ according to the measured atmospheric conditions and narrows the time window $T2_2$ for the second disk 372b according to the formula $$T2_2 = T2 - \Delta T2$$

where $\Delta T2 = 25$ microseconds.

Again, the microcomputer only looks for echo 396b during window time $T2_2$ and when it receives echo 396b, a running total is kept on the offset which is equal to $T_{IDEAL} - T2_1(\text{READ})$. As can be observed from FIG. 25, the second blanking time $T1_2$ is determined as follows:

$$T1_2 = T1_1 + (T_{IDEAL} - T2_1(\text{READ})) + (\Delta T2/2)$$

where $T_{IDEAL} = T2_1(\text{PRESET}) \div 2$.

In other words, the ideal time, $T_{IDEAL}$, after the timer T1, counts down to zero for the sound 394 to hit disk 372a is that time under known ideal atmospheric conditions. This ideal time is adjusted by the actual time read $T2_1(\text{READ})$ to take into account the actual atmospheric effects. Hence, at the end of the second pulse, the timer is adjusted by:

$$T0_2 = T0_1 + [T_{IDEAL} - T2_1(\text{READ})]$$

This process continues for each successive reference disk 372 by continually narrowing the window time T2 by, for example, 25 microseconds each time and by continually adjusting the blanking time, T1, for atmospheric conditions. Narrowing of the window time by increasing the blanking time for each successive disk is done to minimize the pickup of secondary echo reflections from other areas of the tank.

When the window time $T2_i$ times out, the processor knows that a reflection from disk $372_j$ was not present and knows, therefore, that the oil level 340 was between reference disks $372_i$ and $372_j$. At this time all counters T0, T1, and T2 are reinitialized and a second pulse 394 is sent, the blanking time, T1, is set to open the window just below disk $372_i$ and the window time, T2, is set to a maximum value for the actual distance between disks $372_i$ and $372_j$. When the echo 396 is received back, the overall timer T0 is adjusted per the calculation from the earlier reference pulse the running total of offsets and then the distance to the oil is calculated.

In summary, a method and system for determining the level of fluid in the storage tank 10 is set forth. A first acoustic pulse is generated by the transducer under activation by the local sensing unit which is normal to the surface of the fluid. The first acoustic pulse is reflected by each of the reference disks and the reflection is sensed to produce a series of successive analog pulses, one for each disk in descending order. The local sensing unit determines a calibration value of the speed of the first acoustic pulse through the atmosphere between the transducer and the surface of the fluid. The local sensing unit then activates the transducer to direct a second pulse and that pulse is reflected by the surface of the fluid. The transducer generates a second analog signal based upon receipt of the fluid reflection analog signal and the local sensing unit modifies it with the calibration value in order to ascertain the true level of the fluid.

Figure 16:
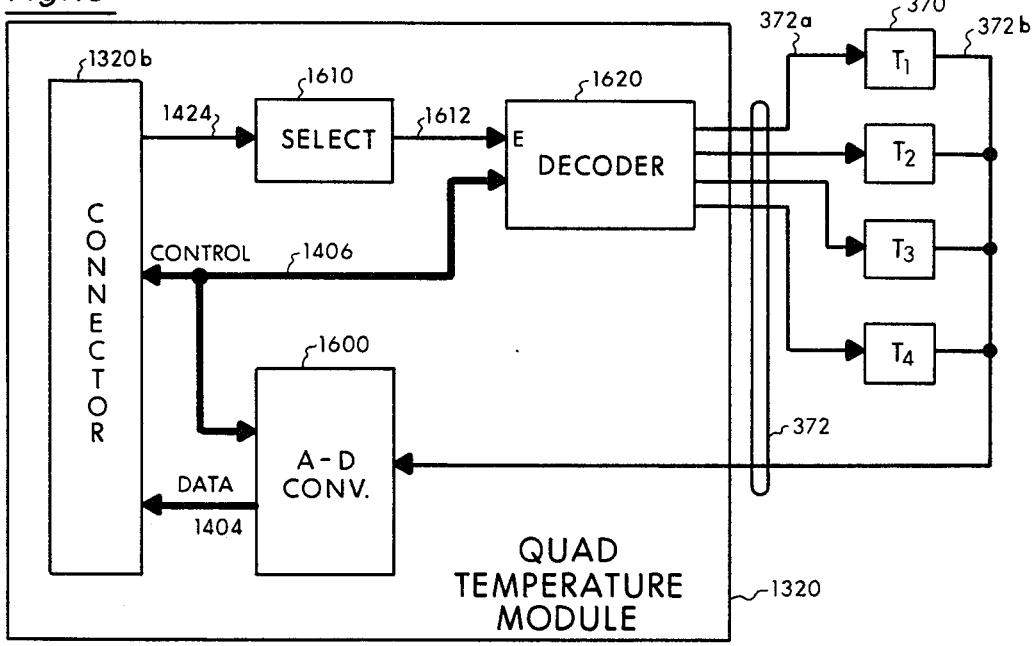
FIG. 16 is a detailed block diagram representation of the electronic quad temperature module of the present invention interconnected with four temperature transducers.

In FIG. 16, the details of the quad-temperature module 1320 are shown to include an analog digital convertor 1600, a select circuit 1610 and a decoder 1620. The analog digital convertor 1600 is connected through connector 1320b to 1320a and hence to the CONTROL bus 1406 and the DATA bus 1404. The A-D convertor 1600 is conventionally available as Model No. ICL7109 from: Intersil, 10710 North Tanton Avenue, Cupertino. Calif. 95014.

The select circuit 1610 is interconnected over lead 1424 to the decoder 1420 on the LSU control board 1300. The select circuit 1610 enables the decoder 1620 over line 1612 and causes the quad-temperature module 1320 to function. The decoder is also conventionally available as Model 74C155 from National Semiconductor Company.

The decoder 1620 is also interconnected to the CONTROL bus 1406 and it further communicates with the four temperature sensors 370 over lines 372. In operation, the quad-temperature module 1320 functions as follows. When the microcomputer 1400 on the LSU control board 1300 desires information from the quad-temperature module 1320, module 1320 is selected by decoder 1420 to become enabled. Once enabled, the A-D convertor 1600 and decoder 1620 function to read each individual temperature sensor 370. Each temperature sensor, as previously mentioned, is a voltage-current transducer. Hence, a voltage is applied on line 372(a) and the current from the sensor proportional to the temperature is delivered on line 372(b) back to the A-D convertor 1600 for digitizing into binary data for delivery on DATA bus 1404 to the microcomputer 1400. The temperature of the oil is determined by the computer by first determining the level of the oil and then by determining which of the four temperature sensors 370 are immersed in the oil based upon the known physical spacings between each temperature sensor. Based upon the operator's requirements, the average, the mean, the high-low values, or other statistical determination of the oil temperature can be made. The temperature of the oil is desired since the volume of oil varies with temperature variations. See *Practical Petroleum Engineer's Handbook* (Fifth Ed.), page 774–85.

The dual flow module 1330 circuit is not detailed in that it is similar to the circuitry shown in FIG. 15 for the ranging module 1310 except that the receiver and transducer control 1550 and 1560 are replaced with suitable conventionally available chips. In all other aspects the circuit would function as the ranging module functions.

Finally, the shut off valve circuit 1340 is similar to the quad module circuit 1320 in that a decoder such as decoder 1620 could be utilized to generate output control signals on lines 372 to activate one or more pieces of equipment like the shut off valve 17. Circuit 1340, however, would not require the use of the A-D convertor 1600.

In conclusion, therefore, it can be observed with reference back to FIG. 13, that LSU 80 functions to conserve power and energy in the primary sense and then when activated to selectively interrogate respective modules to ascertain the values being measured by the transducer in question. This information is then delivered back to the monitoring system 50. In the preferred embodiment, the electronics in LSU 80 are housed in an explosive and fire proof container such as that manufactured by: Crouse-Hinds, Syracuse, N.Y. 13221, as Model EJB-GB.

As shown in FIG. 3, the container is then glued onto the roof 350 of storage tank 10. Once again, gluing is utilized to minimize the generation of a spark in the vicinity of the explosive vapors in the tank 10. Interconnections between the containers are provided by cable 90 and can be run along the atmospheric vent lines 14 connecting tanks 10.

3. Monitoring System (MS) 50

In FIG. 17, the monitoring system 50 is depicted as a remotely located stand-alone center functioning as a weather proof container for the system which includes a protective cover 1700, a communication center 1710, a support stand 1720, an anchor 1730, and an underground storage area 1740 containing the electronics carriage 1750 of the present invention.

Any suitable protective weather cover 1700 can be utilized and, in the embodiment shown in FIG. 17, the protective weather cover includes a weather visor 1702 and an opening generally designated 1704 in which an operator or user can enter, much like a stand-alone telephone booth, and communicate with the monitoring system 50. Exposed in this opening 1704 is the communication access panel 1710 which includes a digital display 1712, a telephone handset 1714, a key pad 1716, and a ticket printer 1718. The protective weather cover 1700 is molded from plastic. An antenna 1760 is provided to provide a communication link with the base monitoring system 110 as shown in FIG. 2. The communication panel functions as an interface between the operator of the system and the system by converting manual operator communication signals into corresponding electrical signals and vice-versa.

The communication panel 1710 is therefore supported a predetermined distance above ground on top of support pipe 1720 which, in the preferred embodiment, is ten inch diameter PVC pipe. This pipe is anchored into the ground 1722 by means of a suitable anchor such as a cement pad 1730 as shown in FIG. 17. The PVC pipe 1720 extends downwardly into the ground a predetermined distance below frost line preferably about eight feet and forms a sealed water-tight underground storage container 1740 in which is disposed the electronics carriage 1750 of the present invention. The electronics carriage 1750 is supported by a steel cable 1752 and electrically communicates with the communication panel 1710 through cable 1754. It is to be noted that electrical cable 1754 is not stressed nor does it support the electronics carriage 1750—all strain and relief being provided by the steel cable 1752. In order to service the electronics carriage 1750, the communication panel 1710 can be moved exposing the top of the support pipe 1720 so that the electronics carriage 1750 can be lifted upwardly by means of steel cable 1752 and serviced as shown in FIG. 18. It is one goal of the present invention to protect the electronics at the monitoring system 50 from theft or damage while at the same time storing it underground at a location that protects it from abusive temperature and weather condition variations. In the preferred embodiment, it is located approximately eight feet underground well below the frost line.

The electronics carriage 1750 is detailed in FIGS. 19 and 20. In FIG. 19, the electronic carriage 1750 includes an eight inch PVC pipe 1900, end caps 1910 and 1920 glued on opposing ends, eye bolt 1930 and a grommet access 1940 for cable 1754. Disposed on the interior of the electronics carriage 1750 is the water-tight electronics housing and electronic power pack areas 1950 and 1960 and batteries 1970. In addition, two curved PVC covers 1962 and 1972 are provided. These covers engage the base of the carriage base 1980. As will be subsequently discussed the electronics as MS 50 receives the level, temperature and flow signals generated by the local sensing unit and the transducers and the electrical signals from the communication panel, processes these signals and stores information for both authorized and unauthorized transfers of crude oil from the storage tanks. If an unauthorized transfer occurs, the electronics extends an alarm signal to alarm 62 and 64. The electronics delivers signals to the communication panel which prints a ticket identifying the operator, the date and time of the transfer, the amount and temperature of the oil transferred and other information.

In FIG. 20, the details of the carriage base 1980 are shown with the covers 1962 and 1972 removed. The base 1980 is typically four feet long and is cut from eight inch PVC pipe in the configuration shown and contains electronic housing area 1950, the power pack area 1960 and the battery area 1970. The base 1980 includes a forward end 2000 with an opposing rearward or bottom end 2010 with a center portion 2020. Affixed on the interior sides, and on both sides of the pipe, are strips of plastic 2030, 2040, 2050 and 2060 which are glued onto the interior surface of the pipe. These strips have holes 2062 for receiving screws. When the covers 1962 and 1972 are in place, screws go through the covers and into holes 2060 and secure the cover to the base 1980. For example, cover 1962 has four screws and is affixed to either side of the base container 1980 in a sealed manner. The covers are cut from PVC pipe to fit into the base 1980 as shown in FIG. 19. Two circular partitions 2070 and 2080 are bonded into the base 1980 and are made from solid circular disks of plastic. Holes 2072 and 2082 are provided to extend electrical cable between the compartments in the carriage. Grommets 2074 and 2084 are also provided in the holes 2072 and 2082.

In this manner, the electronics carriage 1750 contains the electronics for the monitoring system 50. The electronics can be contained in a standard sealed and water-tight junction box and inserted into area 1950. Backup batteries, not shown, can be placed in area 1970. In the preferred embodiment, gel/cell batteries from Gates Rubber Company, 999 South Broadway, Denver, Colo.

80209 are utilized; and, a conventional supply power is provided in area 1960.

Figure 21:
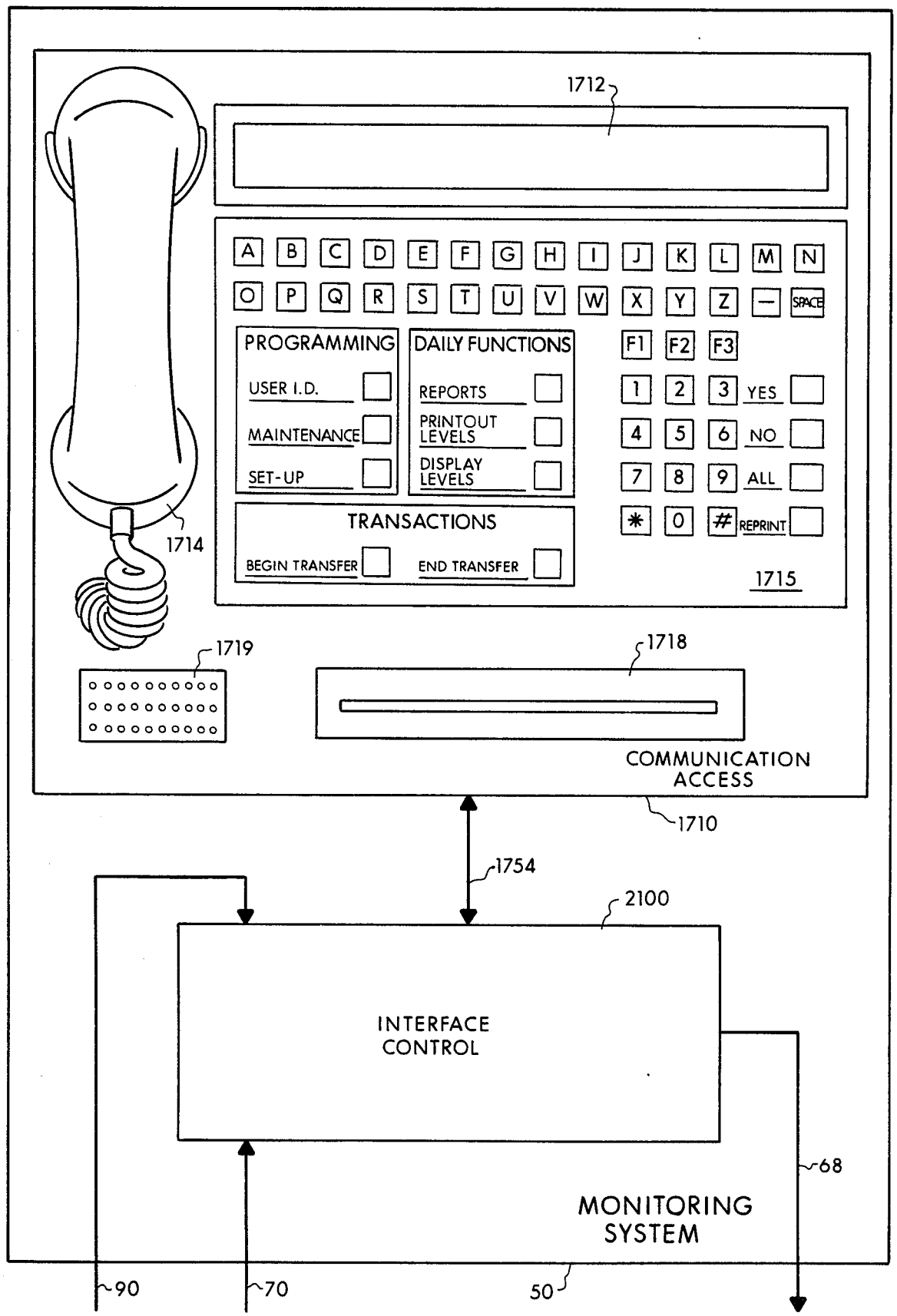

In FIG. 21, the major components of the monitoring system 50 are shown to include the interface control circuit 2100 interconnected with cable 90 to LSU 80 and powered over lines 70 which, as shown in FIG. 1, can be conventionally interconnected to a solar power panel 60, to a wind generator or other alternate power source. In the preferred embodiment, a SOLAREX power panel manufactured by Solarex Corp. of 1335 Piccard Drive, Rockville, Md. is used. The control circuit 2100 is secured in a container located in the housing area 1950 of the electronics carriage 1750. The control circuit 2100 is interconnected over electronics cable 1754 with the communication access panel 1710. The access panel 1710 includes telephone handset 1714, digital display 1712, key pad 1715, and ticket printer 1718 all of which are conventionally available from a number of different manufacturers. The monitoring system 50 functions to provide an interface between the user of the system of the present invention and the electronics contained therein. As shown in FIG. 1, the monitoring system 50 communicators over cable 68 with alarms 62 and 64.

Figure 22:
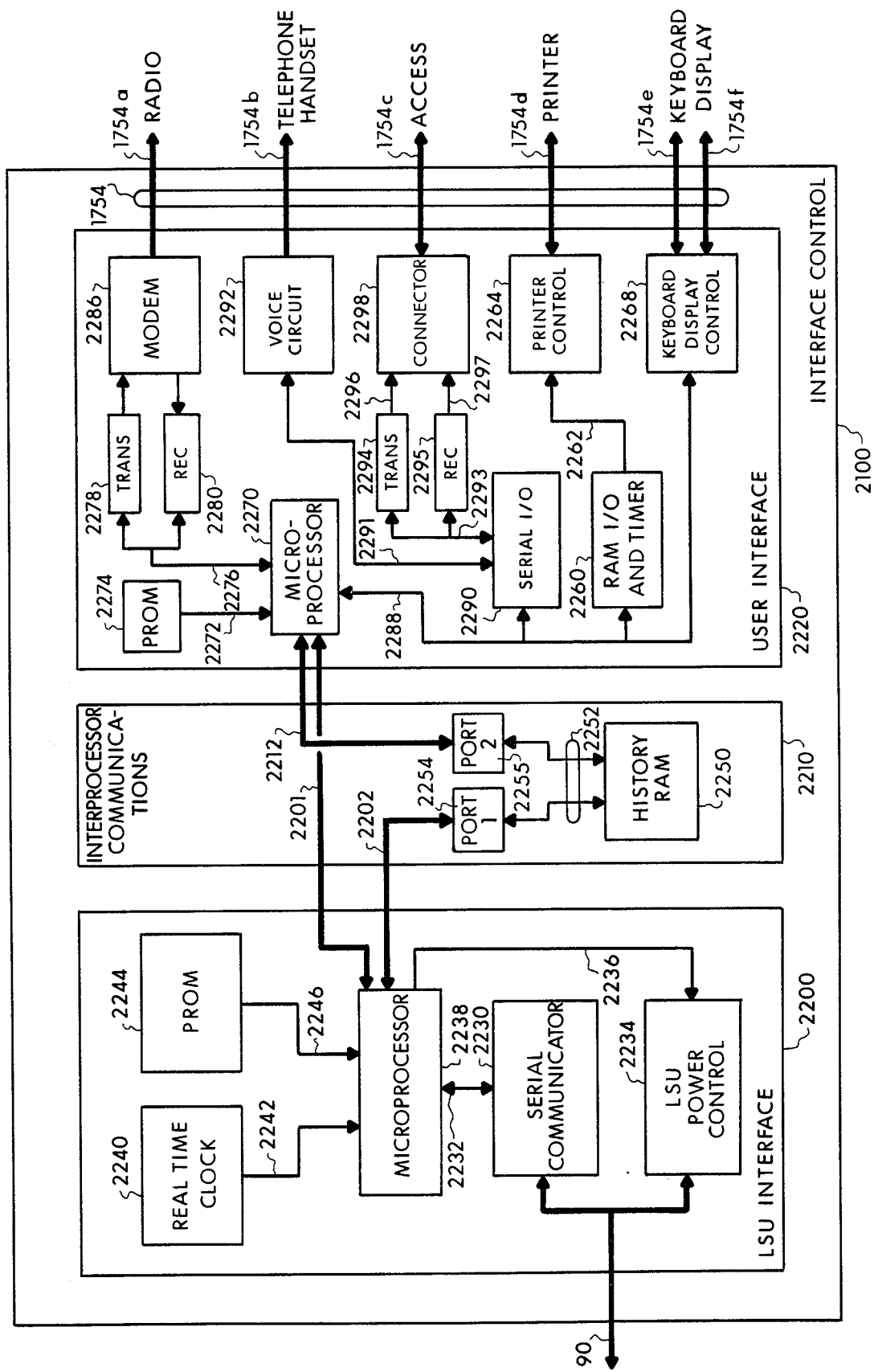

In FIG. 22, the details of the interface control circuit 2100 is set forth to include an LSU interface circuit 2200, an interprocessor communications circuit 2210 and a user interface circuit 2220. The LSU interface circuit 2200 communicates over cable 90 with LSU 80. LSU interface circuit 2200 in turn is connected over bus 2202 with the interprocessor communication circuit 2210 which in turn is connected over bus 2212 to the user interface circuit 2220. The user interface circuit 2220 is then interconnected over cable 1754 to the communication access panel 1710. In operation, LSU 80 and the communications access panel 1710 is independently controlled by separate microprocessors. The LSU interface circuit 2200, therefore, contains a microprocessor which is capable of controlling the activities with regards to the LSU interface and to LSU 80. Likewise, the user interface circuit 2220 contains its own microprocessor for conducting communications with access panel 1710. The two microprocessors can communicate with each other and can jointly store data in interprocessor communications circuit 2210 linking the two systems together.

The LSU interface circuit 2200 includes a serial communicator with a bi-differential drive 2230, an LSU power control circuit 2234, a microprocessor 2238, a real time clock 2240, and a programmable read only memory 2244. The serial communicator bi-differential drive circuit 2230 accesses cable 90 and is further interconnected to the microprocessor 2238 over lines 2232. The serial communicator is conventionally available as Model 74C244 from National Semiconductor Company.

The microprocessor 2238 is further interconnected with the power control 2234 over lines 2236, the real time clock 2240 over lines 2242 and the programmable ROM 2244 over lines 2246. The microprocessor 2238 is the same as LSU microprocessor 1400. The real time clock is conventionally available as Model No. MC 146818 from Motorola Company. The real time clock provides a 99 year timeframe of known time intervals including seconds, minutes, days, months and years and is powered by its own long life battery. The erasable ROM 2244 is from Intel Corp. as Model 2764 and is an (8K×8) UV Erasable PROM. Finally, the LSU power control circuit 2234 is connected to cable 90 and upon command from microprocessor 2238 delivers power to LSU 80.

The LSU interface circuit 2200 is responsive to the known time interval signals from the real time clock and the equipment information from the LSUs 80 for interfacing and delivering the equipment information such as the operational parameters of the storage tanks into the storage contained in the interprocessor communications circuit 2210.

The interprocessor communications circuit 2210 is composed of a random access memory 2250 and dual port controllers 2254 and 2255 and functions to store equipment information and operator information. The random access memory 2250 is interconnected with the dual port controllers over lines 2252 and the dual port controller 2254 interconnects with the LSU interface circuit 2200 over bus 2202 and the dual port controller 2255 interconnects with the user interface circuit 2220 over bus 2212. RAM 2250 is conventionally available as Model 7706 by PRO-LOG Corporation of 2411 Garden Road, Monterey, Calif. 93940. In operation only one microprocessor 2270 and 2238 can access the history RAM 2250 at any given time. A control line 2201 is provided between these microprocessors to allocate priority of access. For example, when microprocessor 2270 is accessing RAM 2250, port circuit 2255 allows the access and a signal over line 2201 informs microprocessor 2238 not to seek access. At this time port circuit 2254 is inactive and places a high impedance condition on lines 2252 so as not to interfere with the operation of port circuit 2255. When microprocessor 2238 accesses history RAM 2250, the reverse of the above occurs.

The user interface circuit 2220 includes a microprocessor 2270 interconnected over lines 2272 with a programmable read only memory 2274. The programmable read only memory is conventionally available as Model 2764 as set forth above. The microprocessor 2270 is also interconnected over lines 2276 with a transmission line 2278 and a receiver line 2280 which in turn are interconnected with a modem 2286. The modem communicates over cable 1754 with a radio transmitter and receiver. The radio operates in the 25–50 MHz range and is conventionally available from: REPCO Inc., 2421 North Orange Blossom Trail, Orlando, Fla. 32854. The modem is also conventionally available as Model V5103P from: Racal-Vadic, 222 Caspian Drive, Sunnyvale, Calif. 94086. The transmission line 2278 is conventionally available as Model DS1489 and the receiver line is conventionally available as Model DS1488 both from National Semiconductor. The microprocessor 2270 utilizes the modem 2286 to transmit and receive information between the monitoring system 110 by means of the aforesaid conventional radio link as shown in FIG. 2 and the remote communications 200 over radio waves or phone lines.

The microprocessor 2270 is also interconnected over lines 2288 to a serial IO receiver and transmitter circuit 2290 which in turn is connected over leads 2291 to a voice synthesizer circuit 2292. The voice synthesizer circuit 2292 is connected to cable 1754b and to telephone handset 1714 in the communication access panel 1710. The serial IO receiver transmitter circuit 2290 is conventionally available as Model 8256 from Intel Corporation. The voice synthesizer circuit is also conventionally available as Model TMS5220A from Texas Instruments in conjunction with conventional read only memory and amplifier circuits. The microprocessor 2270 utilizes this circuit connection to communicate with the user of the access panel through the telephone handset 1714 with artificial speech.

The microprocessor 2270 also communicates through the serial IO receiver transmitter circuit 2290 over lines 2293 with transmission and receiver lines 2294 and 2295 the same as those set forth above interconnected the modem 2286, and are further connected over lines 2296 and 2297 to a connector 2298 which interconnects with cable 1754c to the data access connector 1719 on the communications access panel 1710. The microprocessor 2270 at this point is capable of communicating with the access connector 1719 so that data can be delivered into a capturing device operated by the user of the system. Or, a maintenance repairman can gain access into the interface control 2100 through this interconnection.

The random access memory IO and timer circuit 2260 is interconnected with microprocessor 2270 over bus 2288 which in turn is connected over lines 2262 to a printer controller board 2264. The microprocessor over this interconnection is capable of communicating, in a conventional fashion, with the ticket printer 1718. The random access IO and timer circuit is conventionally available as Model 8155 from Intel Corporation and the printer controller board 2264 is conventionally available as Model No. M400 Interface from: Novatronics Company, Inc., Digital Printing & data Systems, Babylon Industrial Campus, 935 Horsham Road, Horsham, Pa. 19044.

Finally, the microprocessor 2270 also interconnects over bus 2288 with the keyboard and display controller 2268 which in turn is interconnected over cable 1754 on lines 1754e and 1754f with the keyboard 1715 and the display 1712.

Thus, it can be observed that the user interface circuit 2220 provide the electronic processing for the communication access panel and the user of the system.

The user interface circuit 2200 is responsive to the electrical signals from the communication access panel for interfacing and delivering the operator information into the interprocessor communications circuit and is further capable of selectively retrieving the stored equipment and operator information for delivery to the communication access panel for converting said information into operator usable data such as printed tickets.

From the arrangement set forth in the interface control circuit 2100, the LSU interface circuit 2200 can function separately and independently of the user interface circuit 2220 with both circuits having access to the interprocessor communications circuit 2210. The random access memory 2250 in the interprocessor communication circuit 2210 stores the historical data for the system and is capable of retaining data for two years even during power interruptions by means of suitable backup batteries. The operating levels of each tank, the status of the various parameters, the persons accessing the system, and other pertinent data, as will be explained in greater detail, is stored in this random access memory. The dual port 2252 acts as an access manager to process the data currently being considered by microprocessor 2238 or microprocessor 2270.

4. Operation of Monitoring System (MS) 50)

Figure 23:
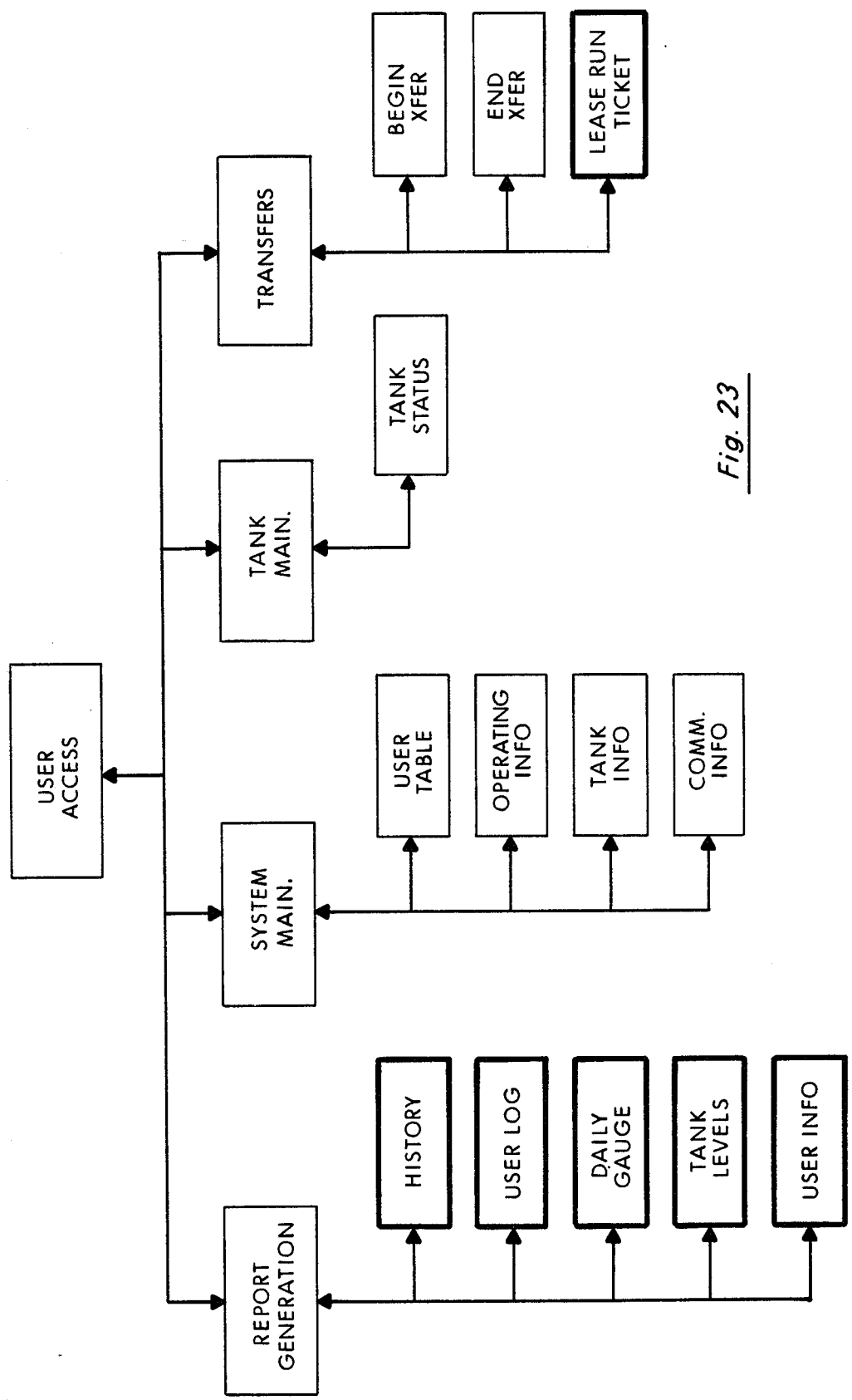

The user interface circuit 2220 as detailed in FIG. 22, comprises a major sub-section system that controls all user interaction including on-line requests, reports, maintenance of the tanks, authorizing users and processing transfers. In FIG. 23, the functions performed by the user interface circuit 2220 are detailed.

In FIG. 23, the user has access through the communication access panel 1710 as shown in FIG. 21. the microprocessor 2270 in the user interface circuit 2220 can communicate with the user through the telephone handset 1714, the access connector 1719, the printer 1718, the keyboard 1715, and the display 1712. The microprocessor 2270 can also communicate with CPU 160 located at the regional base computer system 150. The functions performed by microprocessor 2270 are set forth in FIG. 23 based upon inputs from these users and communications with the rest of the system of the present invention through the interprocessor communication circuit 2210.

Four major functions are apparent in FIG. 23. First the user interface circuit 2220 generates a number of reports to the user. Second and third, maintenance of the system and of the tanks can be performed and, finally, transfers of crude are processed. The system is capable of generating at least six reports typically on a printed ticket by the printer 1718 all of which are highlighted in heavy bold lines. The following reports are generated on four part paper in the report generation mode of operation:

1. History Report—A file is maintained in random access memory 2250 setting forth the history of a tank including tank levels, failure rates, unauthorized transfers, attempts to access the tank, the capacity of the tank, size of the tank, and all authorized and unauthorized transfers from the tank including delivery by the horse head pumper into the tank of new crude. Typically, a weekly report is printed on the ticket summarizing the activities over the prior week.

2. User Log—A file maintained in random access memory 2250 setting forth the history of a particular user with respect to the system and which is available only to certain management personnel who have a proper high level access code. The user log report prints out all activity on the lease including the identity of the user, his access code, and the precise time that each particular user accessed the system whether properly or improperly. For example, the following would be a typical printout for one transfer:

---
9999 Oil Shippers Inc.
BEG XFER 08' 04-7/8" AT 12:04 1/14/83
END XFER 03' 01-4/8" AT 12:56 1/14/83
*** PURCHASE BBL'S 00211

---

In the above example, the truck driver for the account of Oil Shippers Inc. transferred (purchased) 211 barrels of crude. The date, time, and levels in the tank before and after transfer are recorded.

3. Daily Gauge Report—This file in random access memory 2250 performs the function that is conventionally performed by hired personnel. Before this invention, a lease operator manually gauged the oil tanks with a metal strapping tape and took a manual reading of temperature in at least two different places. A ticket is generated, in the present system, setting forth the levels for all tanks. For example, a typical report for one tank would provide:

---
Tank 1
---
Date 01/07/83       13:11

-continued

| Tank 1 | |
|---|---|
| Tank #123A | Size 10' 00 0/8" |
| Level 03' 01 6/8" | PREV 02' 01 6/8" |
| DIFF 01' 00 0/8" | BBL'S 00125 |
| TEMP 075 | |

In the above example, Tank No. 1, serial No. 123A, is a 10 ft. high tank and on 01/07/83 at 1:11 P.M. the level of crude was at 3 feet and 1¾ inch amounting to 125 barrels in the tank. The temperature was 75° F. The previous day's level from the daily gauge was 2 feet and 1¾ inch and the difference indicates the difference between the previous day's reading and the current reading which in this case amounts to a production of one foot.

4. Tank Levels Report—This file in random access memory 2250 sets forth the current status of the tanks being monitored and such a report would, for example, state:

| Tank 2 | |
|---|---|
| Date 12/22/82 | 09:50 |
| SIZE: 10 FT 00 0/8 IN | BBLS: 00254 |
| LEVEL: 06 FT 04 2/8 IN | TEMP: 079 F |

In the above example, Tank No. 2 contains 254 barrels of crude at a level of 6 ft. 4¼ inches at 9:50 A.M. on Dec. 22, 1982. Any person authorized to use the system can obtain this report.

5. User Information Report—This file in random access memory 2250 sets forth the particular identity of a user (name, password and access code) in a printed ticket issued only to the user who knows the access code and password—the password being known only by one person—the intended user. A typical printout for such user information report is as follows:

John Doe
Access Code: 1234
Password: *****

All of the above tickets are generated by the REPORT GENERATION mode of operation of the user interface circuit 2220. The following report is generated during the TRANSFERS mode of operation:

6. Lease Run Ticket—This file produces the printed report recording transfers of oil. This report would provide the following information.

```
              YOUR OIL COMPANY
            YOUR LEASE: #1234567890

LEASE RUN TICKET
                      #1305
                  OIL SHIPPERS INC.
                 Date 01/14/83  12:56
          ================
LOC: NE1/4-SW1/4  SEC: 5     TS: 1-5 RNG: 67W
RED/IND/STATE   ID#: 587435957

TANK 1  ID #L238
SIZE 10' 00-0/8"  BBLS 0400

HIGH
    08' 04-7/8"      075F AT 12:04 01/14/83
                           LOW
    03' 01-4/8"      075F AT 12:56 01/14/83
                           DIFF
    05' 03-3/8"      075F AUG

0211 BBL DELIVERED
```

```
BS&W    [_____]
GRAV    [_____]
    ****************************
              DESTINATION
          PLC REFINERY #1

DRIVER NAME: Peter Smith
            DRIVER #23
            TRUCK #64WP
           TRAILER #64WS
            FOR OIL SHIPPERS INC.
    ****************************
                  ON
    _____ TIME 12:56
    GAUGER
    SEAL NUMBER OFF [_____]
    ===============
                  OFF
    _____ DATE [___]
    SEAL NUMBER ON   [_____]
    ****************************
          OPERATOR: OSSAR SYSTEM
          =========
              Next Ticket #(none)
```

This document sets forth, in detail, the following information automatically generated by the system of the present invention: identity of lease owner (Your Oil Company), identity of Lease (#1234567890), number of ticket (#1305), identity of authorized agent (OIL SHIPPERS INC.), date and time of purchase (Jan. 14, 1983 at 12:56 PM), lease location (NE ¼-SW ¼Sec:5 TS:1-5 RNG 67W), lease identification (#587435957), tank number (No. 1), tank identification (#123A), tank size (10'), tank capacity (400 Bbls), high gauge reading prior to transfer (8'04⅞", 75° F. at 12:04), low gauge reading after transfer (3'-01-4/8", 75° F. at 12:56) the difference in levels (05'-03⅜" at 75° F. AVE), and the number of barrels withdrawn (211 Bbls). The remaining information is hand filled in by the authorized agent.

The second primary function of the user interface control circuit 2220 is to handle the transfers of crude. In this mode of operation, the authorized agent of the present invention communicates with the user interface to authorize the beginning of a transfer. When given authorization to transfer by the system, the user goes over to the appropriate tank, hooks onto transfer pipe 16 and commences to transfer the crude, the flow is immediately sensed by flow indicator 380 an the level 340 of the crude in tank 10 begins to drop. The level drop is sensed by transducer 360 and delivered into the ranging module 1310 for processing by the LSU control board circuitry 1300. The level change information is then communicated over cable 90 to the LSU interface circuit 2200 which stores this information in the history RAM 2250. The microprocessor 2270 in the user interface control circuit 2220 monitors the dropping level of the crude and senses when the level has stabilized (i.e., the transfer is completed). It then enters into an end transfer mode and generates the aforesaid lease run report while in that mode. The aforesaid transfer ticket is then produced for the user of the truck 40 as a receipt for his purchase and as verification that his load represents an authorized transfer.

The remaining functions set forth in FIG. 23 relating to system and tank maintenance are those functions necessary to maintain the system. User tables are generated for each user, setting forth the privilege levels, the current access code and password, and operating information is maintained concerning diagnostics for the system. The necessary functions for performing the tank and communications information are all provided for in the system maintenance function. In the tank maintenance function, the parameters affecting the various sizes of the tanks are entered since it is entirely possible that each storage tank may be of different size configurations or may have unusual circumstances surrounding that particular tank such as a bulge in the side or other anomaly which would effect the capacity of the tank. Hence, the specific condition of the oil field equipment can be taken into account and entered into the tank status parameters of the user interface control circuit 2220.

Figure 24:
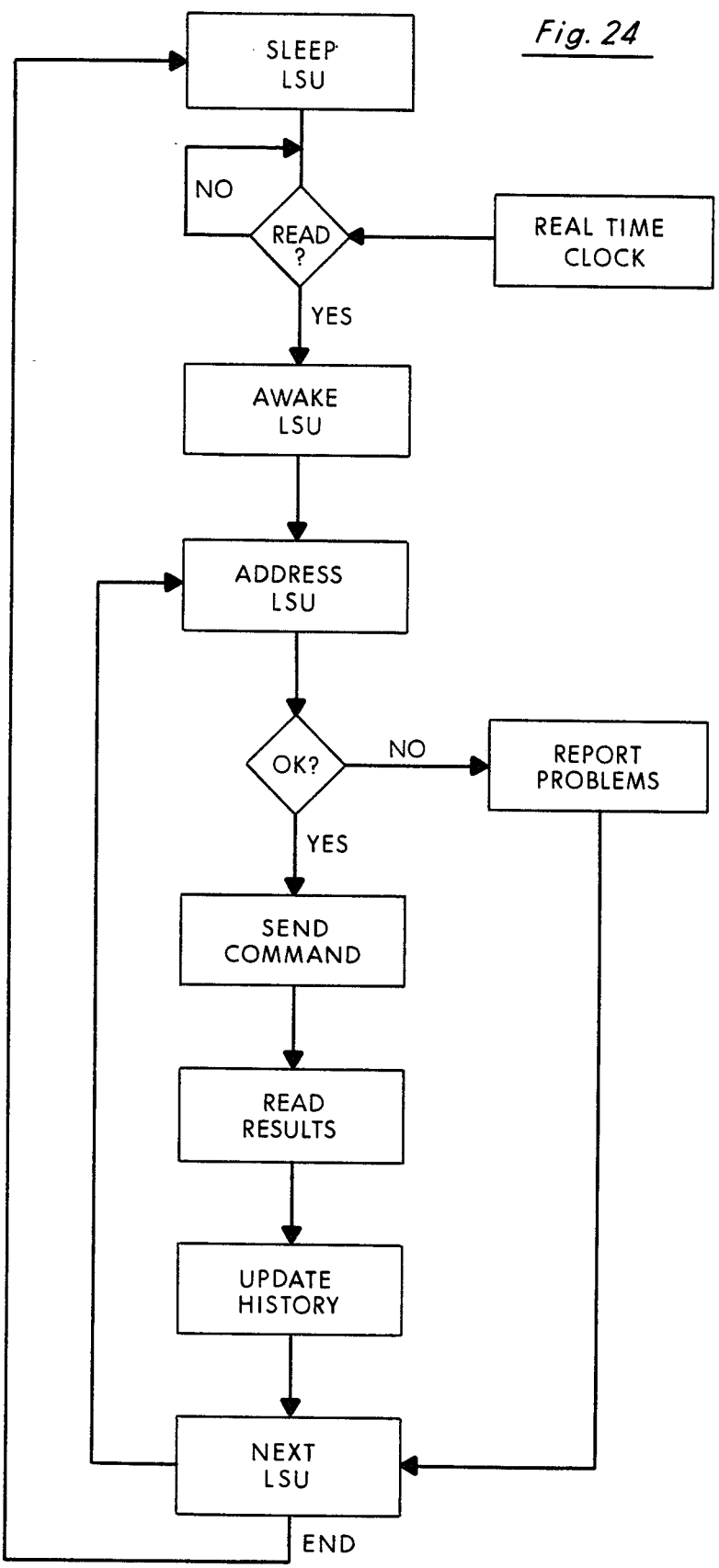

In FIG. 24, the operation of the LSU interface circuit 2200 is set forth. This circuit is controlled by real time clock 2240 and, as shown in FIG. 24, initially all of the LSU's are not powered in order to conserve power. Periodically, such as every five minutes, the microprocessor 2238 receives a signal from the real time clock 2240 and knows that it is time to place all of the LSU's 80 in the sleep mode. When the predetermined time comes, the microprocessor 2238 activates the LSU power control circuit 2234 to deliver power to the LSU control board 1300. When all of the LSUs are placed into the sleep mode, the microprocessor 2238 then addresses one particular LSU module 80 with a serial address. When that particular LSU module has been addressed and acknowledges the connection, that LSU awakes and is fully powered. The microprocessor 2238 then ascertains whether or not the LSU is operative. If it is not, it reports the problems to the history RAM 2250 and cycles to interrogate the next LSU. However, if the LSU reports that it is okay and functioning normally, the microprocessor 2238 sends a command to the LSU so that it can perform one of the many functions already discussed such as measuring the level of the oil, measuring the temperature in the tank, measuring the flow out of the two ports, etc. It then reads the results delivered back to it from the LSU, update the history RAM 2250, puts the LSU back to sleep and goes onto the next LSU. This process continues until all of the LSU's are examined and with the last LSU, the microprocessor 2238 returns all LSU's to an unpowered state.

Figure 26:
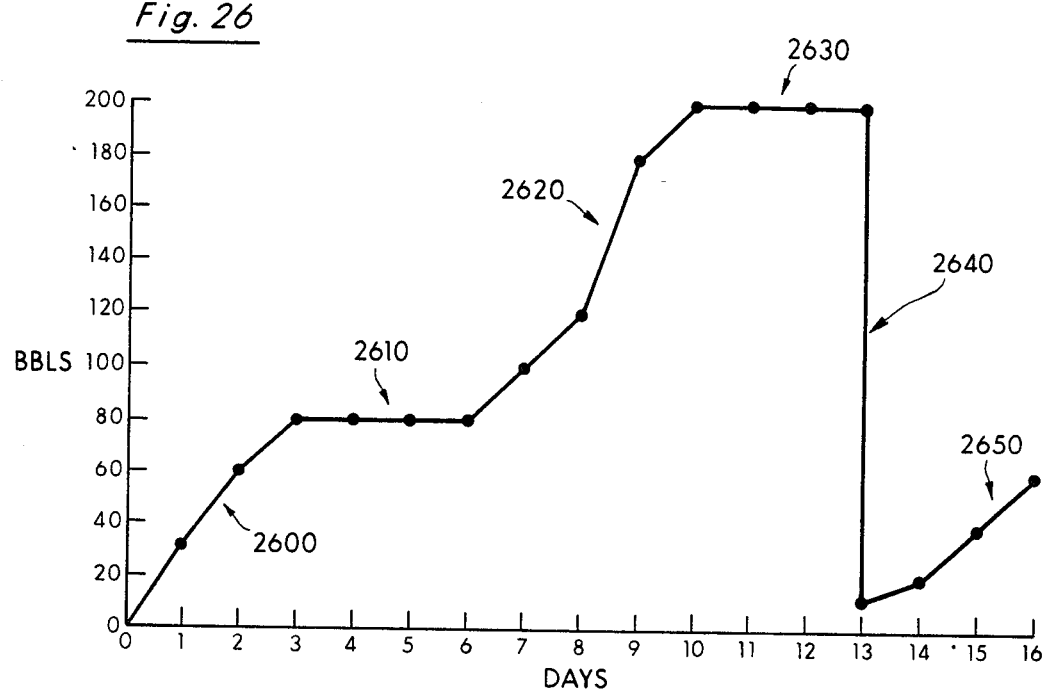
FIG. 26 is a graph setting forth the tank levels in an individual storage tank over a multi-day period.

In FIG. 26 is set forth a typical report generated by the system of the present invention by the computer 160 at the remote base computer system 150 for an individual storage tank. Assuming the tank to be initially empty, the well head pumper 20 delivers crude through pipe 12 into the tank so that the level 340 of the crude in the tank rises as indicated by region 2600 of the curve. On the third day, for whatever reason, the horse head pumper 20 is shut down and production of crude into an individual tank 10 does not occur as indicated by region 2610 for days three, four, five and six. Once the problem has been corrected, the horse head pumper again commences delivery of product during region 2620 of the curve for days six through nine. When the tank is full, the MS 50 activates shut off valve 17 to prevent delivery of further crude into the tank 10 from the horse head pumper 20. The tank is full until a purchase or pickup of crude is made by truck 40. Hence, the crude remains at the fill level 2630 until the truck makes the purchase and the system immediately detects the drop as indicated by region 2640 in the level of the tank. After the transfer is completed, the system in region 2650 commences to permit the horse head pumper 20 to fill the tank.

In this fashion, the management aspect of the present invention is emphasized in that the actual output of an individual tank can be graphically displayed to indicate the historical filling and emptying of the tank.

7. Alternate Embodiment for LSU Control Board 80

Figure 27:
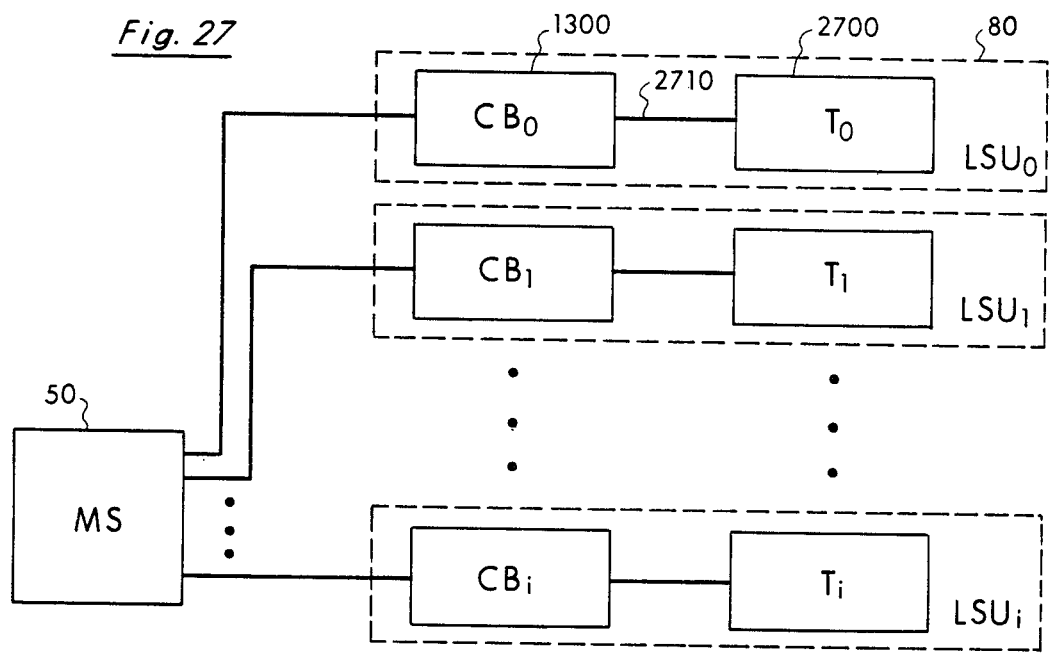
FIG. 27 is a block diagram of an alternate embodiment of the local sensing units of the present invention.
Figure 28:
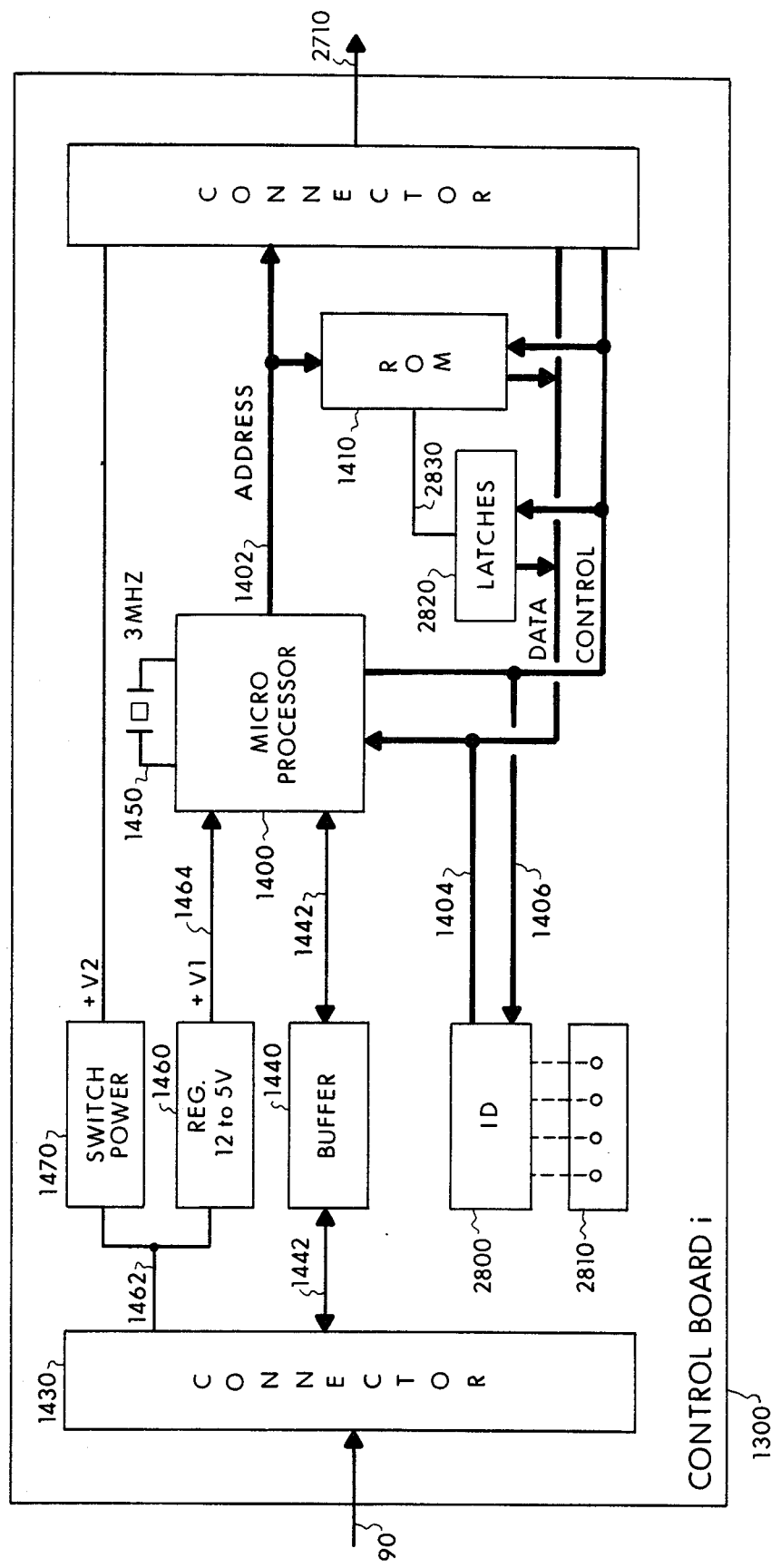
FIG. 28 is a detailed electronic block diagram of the local sensing unit control board of FIG. 27.

In FIGS. 27 and 28 an alternate embodiment of the LSU control board 1300 of the present invention is set forth. In FIG. 27, monitoring station 50 is capable of accessing a number of LSUs 80. In this embodiment, up to two hundred and fifty-five separate LSU modules can be accessed individually by the monitoring station 50. Each LSU 80 includes a control board 1300 accessing a select transducer or controller 2700. This particular embodiment is designed to make the construction of each control board 1300 identical and retrofitable to any type of transducer or controller 2700. Unlike the approach shown in FIG. 14, each control board 1300, of this embodiment, communicates with only one transducer or controller rather than four. Hence, in FIG. 3 for storage tank 10, four separate control boards 1300 would be required to measure the four parameters of (1) flow, (2) oil level, (3) temperature, and (4) cutoff valve.

In FIG. 28, the details of this universal control board 1300 is set forth. Where possible, like identification numerals corresponding to components in FIG. 14 will be utilized. In this embodiment, the switched power 1470 and regulator 1460 operate the control board 1300 and power to the transducer 2700 in the same fashion as for the embodiment in FIG. 14. Buffer 1440 and microcomputer 1400 with clock 1450 and ROM 1410 function in the same fashion. What has been added is an identification circuit 2800 and a bank of switches 2810 interconnected with the data bus 1404 and the control bus 1406. The purpose of the identification circuit 2800 and switches 2810 is to preprogram the identity of the control board to meet the specific needs of the operator of the system. Once programmed, the control board 1300 can be uniquely accessed by the monitoring system 50. Also added to the embodiment shown in FIG. 28 is latches circuit 2820 interconnected with the ROM over lines 2830 and accessing the data and control buses. The latches circuit 2820 serves to temporarily store the data upon delivery from ROM 1410 which can be delivered to the transducer or controller modules 2700.

In all other aspects, the circuit is comparable except for the fact that this embodiment accesses only one transducer or controller 2700 whereas the embodiment in FIG. 14 accesses up to four different modules. The transducer of controller boards 2700 can correspond to the embodiment shown in FIGS. 15 and 16 but for the removal of the select circuits shown therein.

While the present invention has been set forth in a preferred embodiment, it is to be expressly understood that modifications and variations could be made to the preferred embodiment without departing from the scope and spirit of the invention as set forth in the following claims.

We claim:

1. An oil field lease management and security system for monitoring oil field lease equipment and for communicating with authorized operators interacting with said oil field lease equipment, said system comprising:
   a plurality of means connected to said equipment for sensing operational parameters of said equipment,
   a plurality of means connected to said equipment for controlling operational components of said equipment, means separate from said equipment for converting operator communication signals originating from and directed to said authorized operators into corresponding electrical signals, an alarm, and means connected to said converting means and interconnected with said sensing means and with said controlling means for periodically monitoring each of said sensing means and said converting means, said monitoring means being capable of storing equipment information corresponding to said operational parameters and operator information from said converting means and of selectively activating said controlling means based on said equipment and operator information, said monitoring means being further responsive to said operator information for determining whether said operator's interaction with said equipment is authorized, said monitoring means being capable of generating and storing equipment information concerning said operators' interaction, if said operators' interaction is unauthorized with said equipment, said monitoring means being further connected to said alarm for activating said alarm, said converting means being capable of converting said equipment and operator information stored in said monitoring means into operator usable data.

2. The oil field lease management and security system of claim 1 further comprising:

a second alarm, and at least one means at a location remote from said oil field equipment, said converting means, and said monitoring means for communicating with said monitoring means, said communicating means being receptive of an alarm signal from said monitoring system for activating said second alarm and for receiving said equipment and operator information.

3. The oil field lease management and security system of claim 1 in which said monitoring means comprises:

a real time clock for outputting known time intervals, means for storing said equipment and operator information, first means connected to said storing means and to said real time clock and responsive to said equipment information for interfacing and delivering said equipment information into said storing means, the aforesaid equipment information at least containing the identity of said equipment, the operational status of said equipment, and the time when the operational status was determined for each piece of equipment, and second means connected to said storing means and receptive of said electrical signals from said converting means for interfacing and delivering said operator information into said storing means, the aforesaid operator information at least containing the identity of said operator, said second interfacing and delivering means being capable of selectively retrieving said equipment information and said operator information from said storing means and delivering the aforesaid stored information to said converting means.

4. The system of claim 1 wherein said monitoring means and said converting means are contained in a housing comprising:

a communication access panel holding a plurality of communication devices comprising said converting means for communicating with said operator, said devices being capable of generating said electrical signals, and a weatherproof container for holding said communication access panel a predetermined distance above the ground, said container having a portion extending underground a predetermined distance below frost-line and said underground portion being capable of holding said monitoring means in a sealed water-tight environment.

5. The oil field lease management and security system of claim 1 wherein said monitoring means provides power to said sensing means and to said controlling means only during said periodical monitoring thereof.

6. An oil field lease management and security system for monitoring oil field lease equipment and for communicating with authorized operators interacting with said oil field lease equipment, said system comprising:

a plurality of means connected to said equipment for sensing operational parameters of said equipment, a plurality of means connected to said equipment for controlling operational components of said equipment, means separate from said equipment for converting operator communication signals originating from and directed to said authorized operators into corresponding electrical signals, and means connected to said converting means and interconnected with said sensing means and with said controlling means for periodically monitoring each of said sensing means and said converting means, said monitoring means being capable of storing equipment information corresponding to said operational parameters and operator information from said converting means and of selectively activating said controlling means based on said stored equipment and operator information, said monitoring means comprising:

(a) a real time clock for outputting predetermined time intervals, (b) means for storing said equipment and operator information, (c) first means connected to said storing means and to said real time clock and receptive of said equipment information said sensing means for interfacing and delivering said equipment and operator information into said storing means, and (d) second means connected to said storing means and receptive of said electrical signals from said converting means for interfacing and delivering said operator information into said storing means, said second interfacing and delivering means being capable of selectively retrieving said equipment and operator information from said storing means and delivering said stored information to said converting means, said monitoring means being further responsive to said operator information for determining whether said operators' interaction with said equipment is authorized, said monitoring means being capable of generating and storing equipment information concerning said operators' interaction, if said operators' interaction is unauthorized with said equipment said monitoring means being capable of extending an alarm signal, said converting means being capable of converting said equipment and operator information stored in said monitoring means into operator usable data.

7. The system of claim 6 wherein said monitoring means and said converting means are contained in a housing comprising:
   (a) a communication access panel containing said converting means, and
   (b) a weatherproof container for holding said communication access panel a predetermined distance above the ground, said container having a portion extending underground a predetermined distance below frost-line and said underground portion being capable of holding said monitoring means in a sealed water-tight environment.

8. The oil field lease management and security system of claim 6 further comprising:
   an alarm, and
   at least one means at a location remote from said oil field equipment, said converting means, and said monitoring means for communicating with said monitoring means, said communicating means being receptive of said alarm signal from said monitoring system for activating said alarm and for receiving said equipment and operator information.

9. The oil field lease management and security system of claim 6 wherein said monitoring means provides power to said sensing means and controlling means only during said periodical monitoring thereof.

10. An oil field lease management and security system interfacing with an authorized operator for monitoring and controlling crude oil storage and transfer in a plurality of crude oil storage tanks, each of said storage tanks having an inlet and at least one outlet, said system comprising:
   means in each of said storage tanks for at least sensing the level of crude oil in each said tank, the temperature of crude oil in each said tank, and when crude oil flows through said at least one outlet from each said tank, said sensing means being capable of generating signals proportional thereto,
   means separate from said sensing means and receptive of manual interface signals from said authorized operator for converting said manual interface signals into electrical signals representative of operator information, and
   means receptive of the tank information pertaining to said level, temperature, and flow signals from said sensing means and further receptive of said electrical signals from said converting means for monitoring said sensing means and said converting means for transfers of crude oil from said tanks, said monitoring means being capable of storing said tank information for all said transfers and being further capable of transmitting an alarm signal when said transfer of crude oil from said tanks is unauthorized, said converting means being capable of outputting said stored tank and operator information for said transfers for use by said authorized operator, said outputted information at least identifying said authorized operator, the date and time of said transfer, and the amount and temperature of crude oil transferred.

11. The system of claim 10 in which said sensing means further comprises:
   an ultrasonic transducer located on the underside of the roof of each of said storage tanks for detecting the level of crude oil in said tank and for generating a signal proportional thereto,
   a plurality of temperature transducers oriented in a predetermined vertical path in said storage tank for detecting the temperature in said tank and for generating a signal proportional thereto,
   a flow transducer coupled to said at least one outlet from said tank for detecting when fluid is flowing in said outlet and for generating a signal in that event, and
   means on said storage tank receptive of said ultrasonic transducer signal, of said temperature transducers signal, and of said flow transducer signal for producing said tank information representative of the actual level of fluid in said tank, a statistical temperature measurement of oil in said tank, and when a transfer of fluid is occurring from said tank.

12. The system of claim 10 wherein said monitoring means comprises:
   a real time clock for outputting second, minute, hour, day, week, month and year time intervals,
   means for storing said tank and operator information,
   first means connected to said storing means and to said real time clock and responsive to said level, temperature, and flow signals from said sensing means for interfacing and delivering said tank information into said storing means, the aforesaid tank information at least containing the identity of each said tanks, the level of oil in each of said tanks, the time when oil flows out from and into each of said tanks, and the temperature of oil in each of said tanks, and
   second means connected to said storing means and receptive of said electrical signals from said converting means for interfacing and delivering said operator information into said storing means, the aforesaid operator information at least containing the identity of said operator, said second interfacing and delivering means being capable of selectively retrieving said tank information and said operator information from said storing means and delivering said stored information to said converting means.

13. The system of claim 10 further comprising:
   means at a location remote from said oil storage tanks, said sensing means, and said monitoring means for communicating with said monitoring means, said remote communicating means being capable of selectively receiving said stored tank and operator information and said alarm signal,
   an alarm, and
   said remote communicating means being capable of activating said alarm when said alarm signal is received.

14. The system of claim 10 wherein said monitoring means monitors said tank information only during predetermined periodical time intervals and provides a first level of low power during said predetermined time intervals to all sensing means and a second level of higher power to each individual sensing means only when said sensing means is sensing tank information and generating signals proportional thereto, said sensing means being unpowered at times other than during said predetermined time intervals.

15. The system of claim 10 further comprising a means connected to each of said storage tank inlets for preventing flow of crude oil into said inlet, said monitoring means interconnected with said preventing means for activating said preventing means when said sensing means senses the level of said crude oil in each said tank at a predetermined full level.

16. An oil field lease management and security system interfacing with the operator for monitoring and controlling crude oil storage and transfer in a plurality of crude oil storage tanks, said system comprising:
- a transducer in each of said storage tanks for detecting the level of crude oil in said tank and for generating a signal proportional thereto,
- a plurality of temperature transducers oriented in a predetermined vertical path in said storage tank for detecting the temperature in said tank and for generating signals proportional thereto,
- means on each storage tank receptive of said transducer signals and of said temperature transducer signal for producing tank information representative of the actual level of fluid in said tank, a statistical temperature measurement of oil in said tank, and when a transfer of fluid is occurring from the tank,
- means receptive of manual interface signals from said operator for converting said manual interface signals into electrical signals representative of operator information, and
- means receptive of said tank information from said producing means and further receptive of said operator information from said converting means for monitoring said producing means and said converting means, said monitoring means being capable of storing said monitored tank and operator information, said monitoring means being further responsive to said operator information for determining whether said operator's interaction with said tanks is authorized, if said operator's interaction with said tanks is unauthorized, said monitoring means being further capable of transmitting an alarm signal, said converting means being capable of printing said stored tank and operator information for use by said operator, said printed information at least identifying said operator, the date and time of said transfer, and the amount and temperature of crude oil transferred.

17. The system of claim 16 wherein said monitoring means comprises:
- a real time clock for outputting known time intervals,
- means for storing said tank and operator information,
- first means connected to said storing means and to said real time clock and responsive to said tank information from said sensing means for interfacing and delivering said tank information into said storing means, the aforesaid tank information at least containing the identity of each said tanks, the level of oil in each of said tanks, the time when oil flows out from and into each of said tanks, and the temperature of oil in each of said tanks, and
- second means connected to said storing means and receptive of said operator information from said converting means for interfacing and delivering said operator information into said storing means, the aforesaid operator information at least containing the identity of said operator, said second interfacing and delivering means being capable of selectively retrieving said tank information and said operator information from said storing means and delivering the aforesaid information to said converting means.

18. The system of claim 16 further comprising:
- means at a location remote from said oil storage tanks, said sensing means, and said monitoring means for communicating with said monitoring means, said remote communicating means being capable of selectively receiving said stored tank and operator information and said alarm signal,
- an alarm, and
- said remote communicating means being capable of activating said alarm when said alarm signal is received.

19. An oil field lease management and security system interfacing with the operator for monitoring and controlling crude oil storage and transfer in a plurality of crude oil storage tanks, said system comprising:
- a transducer in each of said storage tanks for detecting the level of crude oil in said tank and for generating a signal proportional thereto,
- a plurality of temperature transducers oriented in a predetermined vertical path in said storage tank for detecting the temperature in said tank and for generating signals proportional thereto,
- means on each storage tank receptive of said transducer signals and of said temperature transducer signal for producing tank information representative of the actual level of fluid in said tank, a statistical temperature measurement of oil in said tank, and when a transfer of fluid is occurring from the tank,
- means receptive of manual interface signals from said operator for converting said manual interface signals into electrical signals representative of operator information,
- means receptive of said tank information from said sensing means and further receptive of said operator information from said converting means for monitoring said sensing means and said converting means, said monitoring means being capable of storing said monitored tank and operator information, said monitoring means being further responsive to said operator information for determining whether said operator's interaction with said tanks is authorized, if said operator's interaction with said tanks is unauthorized, said monitoring means being further capable of transmitting an alarm signal, said converting means being capable of printing said stored tank and operator information for use by said operator, said printed information at least identifying said operator, the date and time of said transfer, and the amount and temperature of crude oil transferred, and
- said monitoring means and said converting means being contained in a housing comprising:
  (a) a communication access panel holding a plurality of communication devices comprising said converting means for communicating with said operator, said devices being capable of generating said operator information, and
  (b) a weatherproof container for holding said communication access panel a predetermined distance above the ground, said container having a portion extending underground a predetermined distance below frost-line and said underground portion being capable of holding said monitoring means in a sealed water-tight environment.

20. The system of claim 16 wherein said monitoring means monitors said tank information only during predetermined periodical time intervals and provides a first level of power during said predetermined time intervals to all producing means and a second level of higher power to each individual producing means and interconnected level and temperature transducers only when said means is producing said tank information, said producing means and interconnected level and temperature transducers being unpowered at times other than during said predetermined time intervals.

21. An oil field lease management system interfacing with an operator for monitoring and controlling crude oil storage and tansfer in a plurality of crude oil storage tanks, said system comprising:
   means in each of said storage tanks for at least sensing the level of crude oil in each said tank and the temperature of crude oil in each said tank, said sensing means being capable of generating signals proportional to the aforesaid tank information,
   means receptive of manual interface signals from said operator for converting said manual interface signals into electrical signals representative of operator information,
   a real time clock for outputting known time intervals,
   means for storing said operator and tank information,
   first means connected to said storing means and to said real time clock and responsive to said level and temperature signals from said sensing means for interfacing and delivering said tank information into said storing means, the aforesaid tank information at least containing the identity of each of said tanks, the level of oil in each of said tanks, and the temperature of oil in each of said tanks, and
   second means connected to said storing means and receptive of said electrical signals from said converting means for interfacing and delivering said operator information into said storing means, the aforesaid operator information at least containing the identity of said operator, said second interfacing and delivering means being capable of selectively retrieving said tank information and said operator information from said storing means and delivering the aforesaid stored information to said converting means, said converting means being capable of outputting said stored tank and operator information for use by said operator, said outputted information at least identifying said operator, the date and time of said transfer, and the amount and temperature of crude oil transferred.

22. The system of claim 21 further comprising:
   means at a location remote from said oil storage tanks, said sensing means, and said monitoring means for communicating with said monitoring means, said remote communicating means being capable of selectively receiving said stored tank and operator information.

23. An oil field lease management and security system interfacing with an operator for monitoring and controlling crude oil storage and transfer in a plurality of crude oil storage tanks, each of said storage tanks having an inlet and at least one outlet, said system comprising:
   an ultrasonic transducer located on the underside of the roof of each of said storage tanks for detecting the level of crude oil in said tank and for generating a signal proportional thereto,
   a plurality of temperature transducers oriented in a predetermined vertical path in said storage tank for detecting the temperature of oil in said tank and for generating signals proportional thereto,
   a flow transducer coupled to said at least one outlet from said tank for detecting when fluid is flowing in said outlet and for generating a signal in that event,
   means on each storage tank receptive of said ultrasonic transducer signal, of said temperature transducer signal, and of said flow transducer signal for producing signals representative of information pertaining to each of said tanks,
   means receptive of manual interface signals from said operator for converting said manual interface signal into electrical signals representative of operator information,
   means receptive of the tank information pertaining to said level, temperature, and flow signals from said ultrasonic temperature, and flow transducers and further receptive of said electrical signals from said converting means for monitoring each of the aforeasid transducers and said converting means, said monitoring means comprising:
   (a) a real time clock for outputting known time intervals,
   (b) means for storing said tank and operator information,
   (c) first means connected to said storing means and to said real time clock and receptive of said tank information from said producing means for interfacing and delivering said tank information into said storing means, and
   (d) second means connected to said storing means and receptive of said electrical signals from said converting means for interfacing and delivering said operator information into said storing means, said second interfacing and delivering means being capable of selectively retrieving said tank and operator information from storing means and delivering said stored information to said converting means, said monitoring means being capable of storing said tank information and for tansmitting an alarm signal for said unauthorized transfers of crude oil from said tanks when said operator's interaction with said tanks is unauthorized, and said converting means being capable of printing said stored tank and operator information for use by said operator, said printed information identifying said operator for authorized transfers, the date and time of said authorized and unauthorized transfers, and the amount and temperature of crude oil transferred for each transfer.

24. The system of claim 23 wherein said monitoring means and said converting means are contained in a housing comprising:
   a communication access panel holding a plurality of communication devices comprising said converting means for communicating with said operator, said devices being capable of generating electrical signals, and
   a weatherproof container for holding said communication access panel a predetermined distance above the ground, said container having a portion extending underground a predetermined distance below frost-line and said underground portion being capable of holding said monitoring means in a sealed water-tight environment.

25. The system of claim 23 wherein said monitoring means accesses all of said producing means only during predetermined periodical time intervals, said monitoring means providing a first level of low power during said predetermined time interval to all of said producing means and a second level of higher power to each individual producing means only when each individual producing means is producing said tank information, said second level of power being sufficient to power the ultrasonic, flow, and temperature transducers interconnected with the aforesaid individual producing means.

26. The system of claim 23 further comprising a means connected to each said storage tank inlet for preventing flow of crude oil into said inlet, said monitoring means interconnected with said preventing means for activating said preventing means when said sensing means senses the level of said crude oil in each said tank at a predetermined full level.

27. An oil field lease management and security system interfacing with an operator for monitoring and controlling crude oil storage and transfer in a plurality of crude oil storage tanks, said system comprising:

means at each of said storage tanks for sensing transfers of crude oil from each said tank, said sensing means being capable of generating tank information representative of said transfer, means receptive of manual interface signals from said operator for converting said manual interface signals into electrical signals representative of operator information, and means receptive of said tank information from said sensing means and further receptive of said operator information from said converting means for monitoring said sensing means and said converting means, said monitoring means being capable of storing said tank information pertaining to transfers of crude oil and for transmitting an alarm signal when said operator's interaction with said tanks is unauthorized, said converting means being capable of outputting said stored tank and operator information for use by said operator, said outputted information at least identifying said operator for authorized transfers, the date and time of said authorized and unauthorized transfers, and the amount and temperature of crude oil transferred for each transfer.

28. The system of claim 27 wherein said monitoring means comprises:

a real time clock for outputting known time intervals, means for storing said tank and operator information, first means connected to said storing means and to said real time clock and receptive of said tank information from said sensing means for interfacing and delivering said tank information into said storing means, the aforesaid tank information at least containing the identity of each of said tanks, the level of oil in each of said tanks, the time when oil flows out from and into each of said tanks, and the temperature of oil in each of said tanks, and second means connected to said storing means and receptive of said electrical signals from said converting means for interfacing and delivering said operator information into said storing means, the aforesaid operator information at least containing the identity of said operator, said second interfacing and delivering means being capable of selectively retrieving said tank information and said operator information from said storing means and delivering the aforesaid information to said converting means.

* * * * *